(12) United States Patent
Gordon et al.

(10) Patent No.: US 6,561,132 B2
(45) Date of Patent: May 13, 2003

(54) FELINE EXCRETIA PROCESSING AND ELIMINATION SYSTEM

(75) Inventors: Tal Gordon, Hod Hasharon (IL); Erel Benjamini, Kfar Saba (IL)

(73) Assignee: Pets 'N People Ltd., Tel Aviv (IL)

( * ) Notice: Subject to any disclaimer, the term of this patent is extended or adjusted under 35 U.S.C. 154(b) by 0 days.

(21) Appl. No.: 09/951,901

(22) Filed: Sep. 14, 2001

(65) Prior Publication Data

US 2003/0051672 A1 Mar. 20, 2003

(51) Int. Cl.⁷ .............................................. A01K 29/00
(52) U.S. Cl. ........................................ 119/171; 119/173
(58) Field of Search .............................. 119/171, 173; 502/80

(56) References Cited

U.S. PATENT DOCUMENTS

| | | | |
|---|---|---|---|
| 2,204,416 A | 6/1940 | Kramer | |
| 3,227,138 A | 1/1966 | Campbell | |
| 3,618,568 A | 11/1971 | Breeden | |
| 3,734,057 A | 5/1973 | Lee et al. | |
| 3,765,371 A * | 10/1973 | Fisher | 119/171 |
| 3,793,988 A | 2/1974 | Traeger | |
| 3,822,673 A | 7/1974 | Benny | |
| 3,965,863 A | 6/1976 | Scott | |
| 4,196,693 A | 4/1980 | Unversaw | |
| 4,506,628 A * | 3/1985 | Stockel | 119/171 |
| 4,574,735 A | 3/1986 | Hohenstein | |
| 4,593,645 A | 6/1986 | Dingler | |
| 4,641,605 A * | 2/1987 | Gordon | 119/171 |
| 4,729,342 A | 3/1988 | Loctin | |
| 4,881,490 A * | 11/1989 | Ducharme et al. | 119/173 |
| 5,003,920 A | 4/1991 | Miksitz | |
| 5,048,464 A | 9/1991 | Shirley | |
| 5,113,801 A | 5/1992 | Rotstein et al. | |
| 5,134,727 A | 8/1992 | Scott | |
| 5,140,948 A | 8/1992 | Roberts | |
| 5,207,830 A * | 5/1993 | Cowan et al. | 106/672 |
| 5,289,799 A | 3/1994 | Wilson | |
| 5,303,676 A * | 4/1994 | Lawson | 119/173 |
| 5,307,761 A | 5/1994 | Berger, III et al. | |
| 5,339,769 A * | 8/1994 | Toth et al. | 119/173 |
| 5,724,915 A * | 3/1998 | Ochi et al. | 119/173 |
| 5,743,213 A * | 4/1998 | Fujiura et al. | 119/171 |
| 5,996,533 A | 12/1999 | Gordon | |
| 6,138,609 A | 10/2000 | Gordon | |

* cited by examiner

*Primary Examiner*—Charles T. Jordan
*Assistant Examiner*—Jordan M Lofdahl
(74) *Attorney, Agent, or Firm*—Browdy and Neimark, P.L.L.C.

(57) ABSTRACT

A feline excretia processing and elimination system and method including a cat toilet bowl unit, a reusable cat litter disposed in the cat toilet bowl unit and a multifunctional assembly cooperative with the cat toilet bowl unit for separating cat feces and urine from the reusable cat litter and flushing the cat feces and urine from the cat toilet bowl unit.

5 Claims, 39 Drawing Sheets

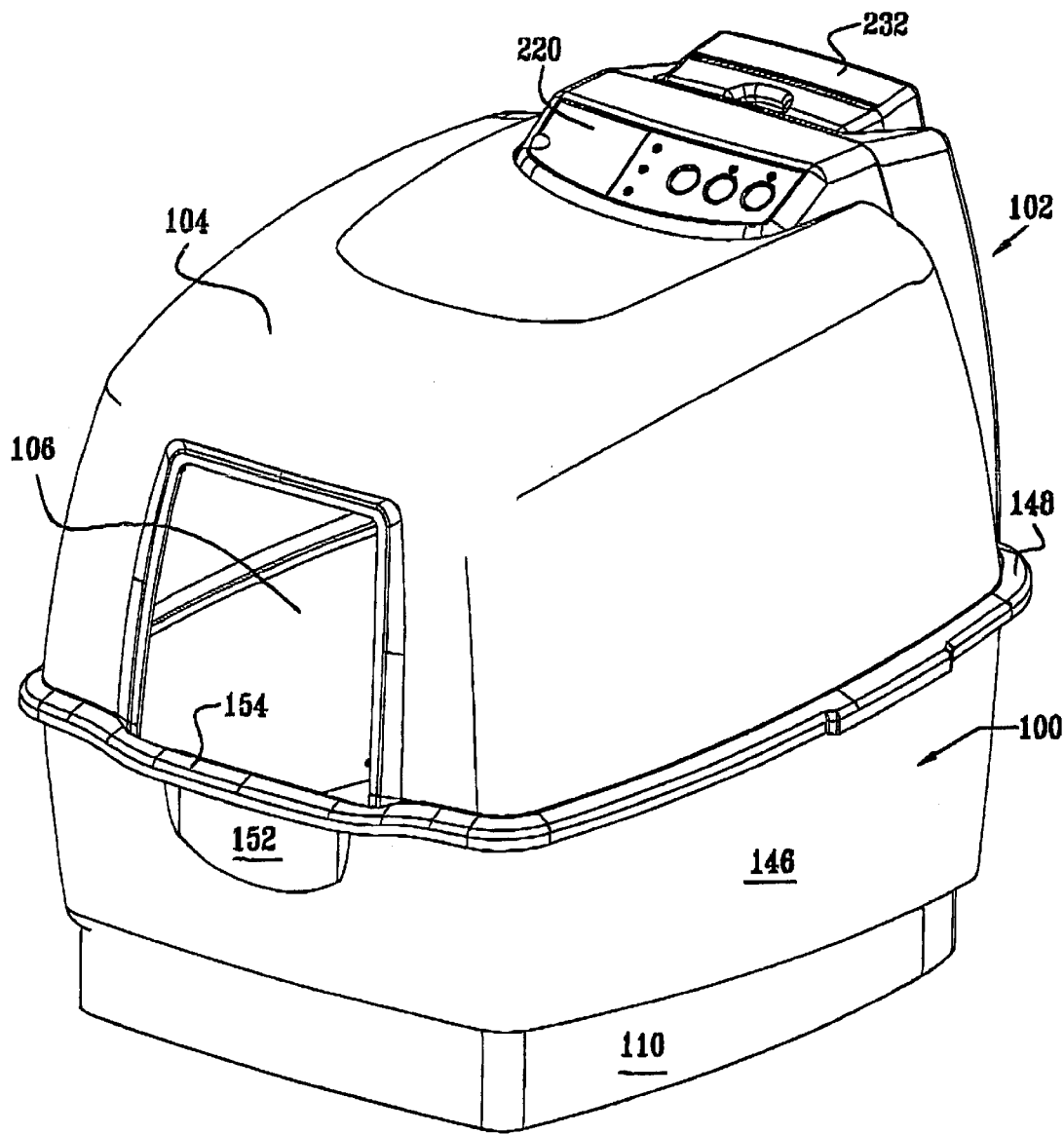

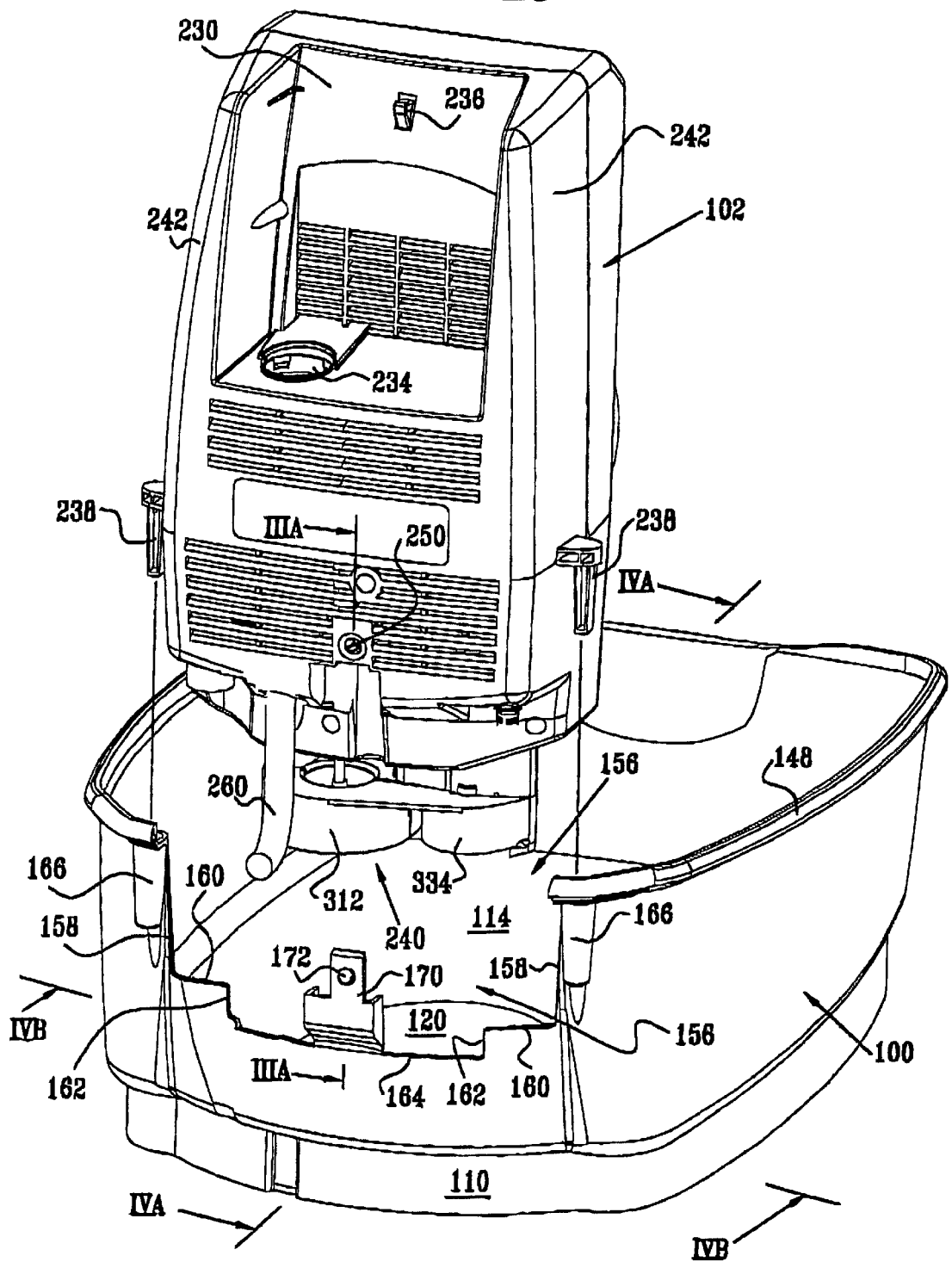

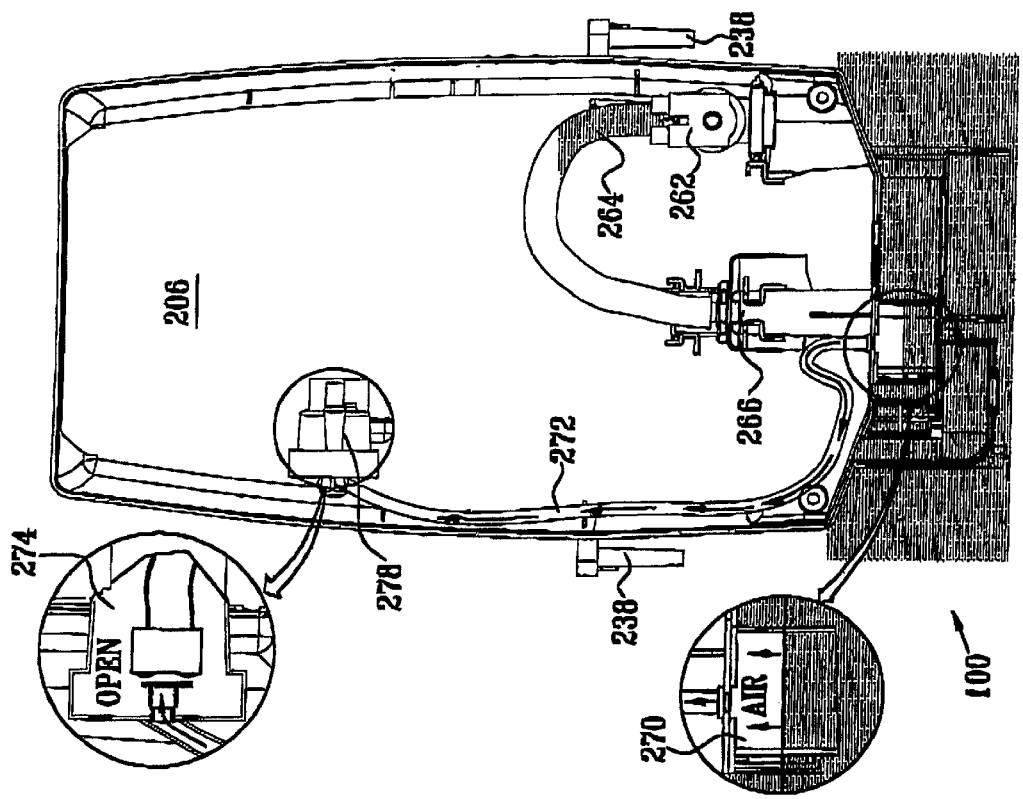
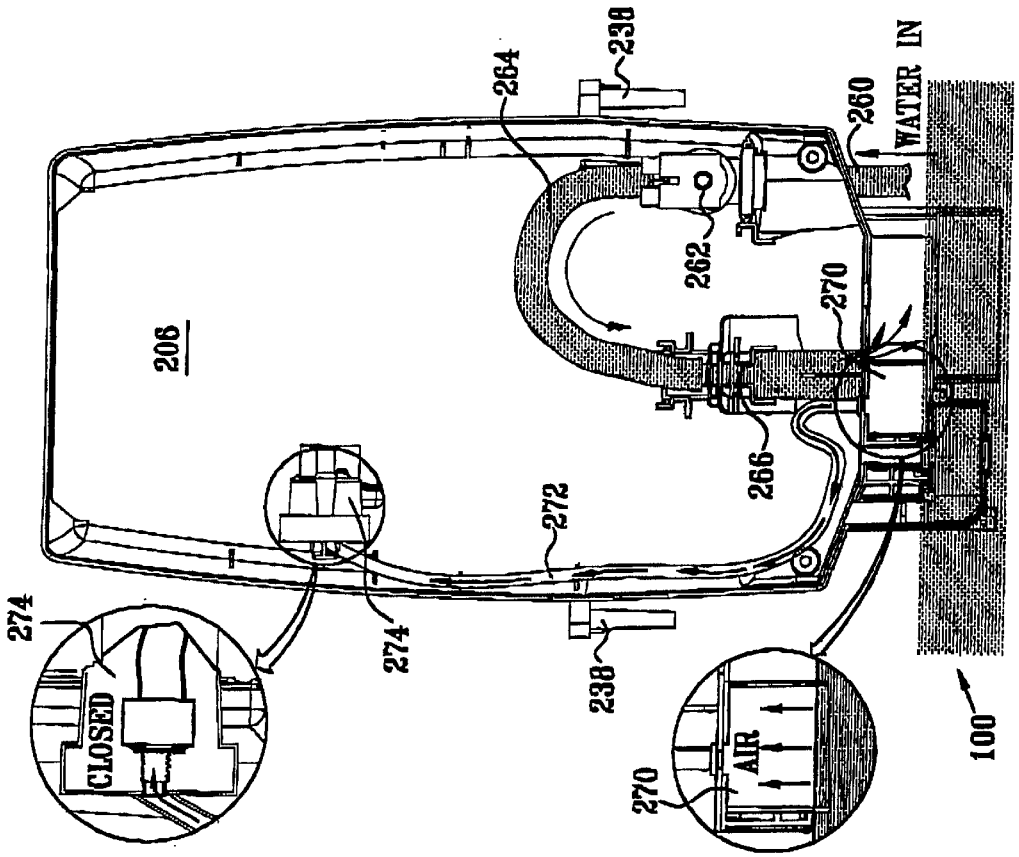

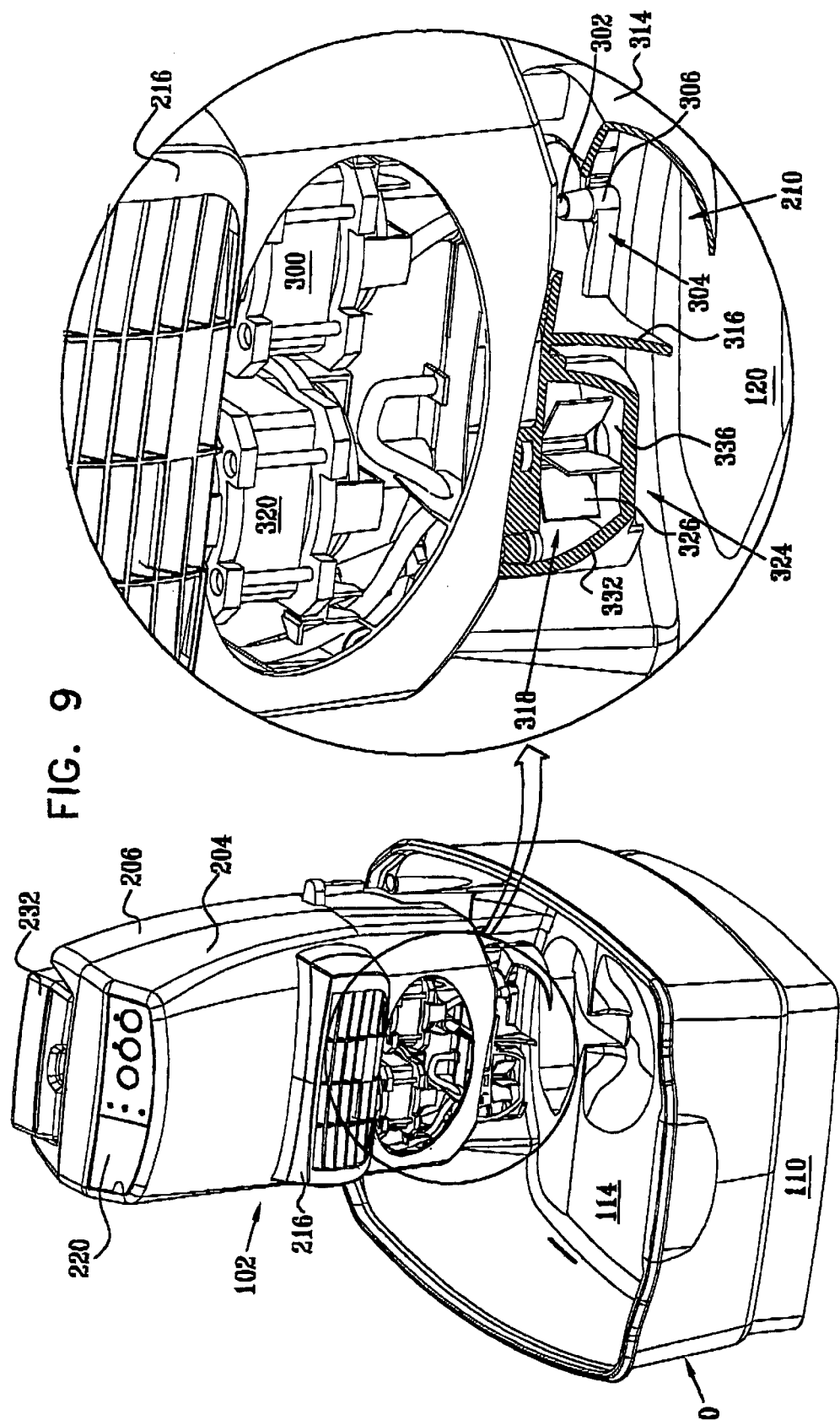

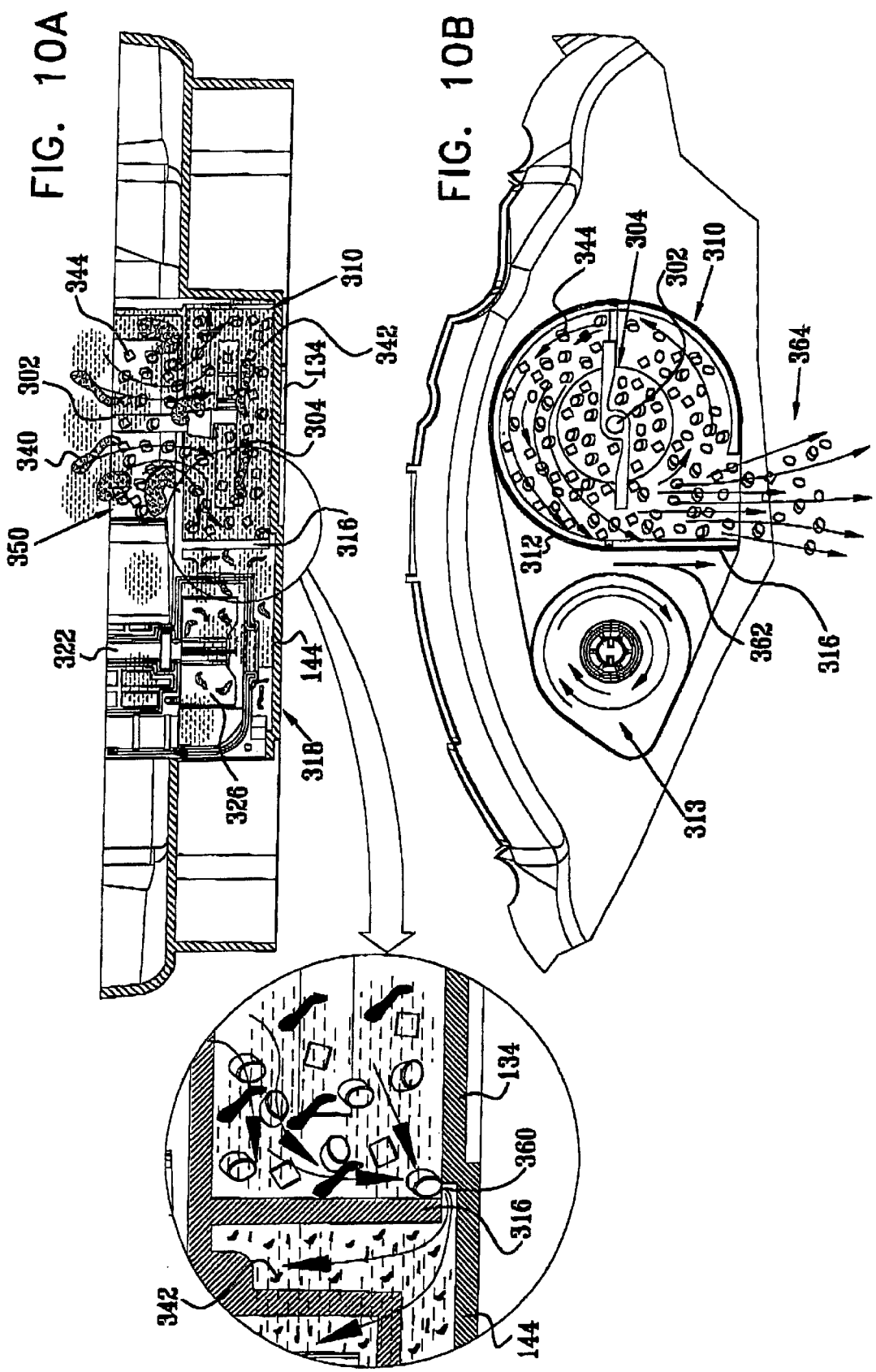

FELINE EXCRETIA PROCESSING AND ELIMINATION SYSTEM

FIELD OF THE INVENTION

The present invention relates to pet care systems and methodologies generally.

BACKGROUND OF THE INVENTION

The following U.S. Patents are believed to be representative of the current state of the art:

U.S. Pat. Nos. 2,204,416; 3,227,138; 3,618,568; 3,734,057; 3,793,988; 3,822,673; 3,965,863; 4,196,693; 4,574,735; 4,593,645; 4,729,342; 5,003,920; 5,048,464; 5,113,801; 5,134,727; 5,140,948; 5,289,799; 5,307,761; 5,996,533; 6,138,609.

SUMMARY OF THE INVENTION

The present invention seeks to provide a highly effective system and methodology for processing and eliminating feline feces.

There is thus provided in accordance with a preferred embodiment of the present invention a feline excretia processing and elimination system. The system includes a cat toilet bowl unit, a reusable cat litter disposed in the cat toilet bowl unit and a multifunctional assembly cooperative with the cat toilet bowl unit for separating cat feces and urine from the reusable cat litter and flushing the cat feces and urine from the cat toilet bowl unit.

Further in accordance with a preferred embodiment of the present invention the multifunctional assembly is removably and lockably mounted onto the cat toilet bowl unit.

Still further in accordance with a preferred embodiment of the present invention the system also includes a cover having a cat ingress and egress opening.

Additionally in accordance with a preferred embodiment of the present invention the cat toilet bowl unit includes a generally peripheral base portion arranged to be supported on a generally flat and level surface and to support a bottom bowl surface which is generally inclined downwardly towards a portion of the bowl unit.

Preferably, the bottom bowl surface is formed with a recess of increasing depth in the general direction of downward incline of the bottom bowl surface. Typically, the recess leads into a crushing and filtering chamber housing.

Further in accordance with a preferred embodiment of the present invention the crushing and filtering chamber housing cooperates with elements of the multifunctional assembly to define a crushing and filtering chamber.

Further in accordance with a preferred embodiment of the present invention the system also includes adjacent the crushing and filtering chamber housing, a pumping chamber housing.

Preferably, the pumping chamber housing cooperates with elements of the multifunctional assembly to define a pumping chamber.

Further in accordance with a preferred embodiment of the present invention the cat toilet bowl unit also includes, extending above the bottom bowl surface, a generally upstanding peripheral bowl side wall.

Preferably, at a rear portion of the cat toilet bowl unit, the peripheral side wall is preferably provided with a cut-out for accommodating the multifunctional assembly.

Still further in accordance with a preferred embodiment of the present invention the multifunctional assembly includes a two-part housing and includes a forward facing housing portion and a rearward facing housing portion.

Additionally in accordance with a preferred embodiment of the present invention the multifunctional assembly includes a water supply subsystem, a crushing and pumping subsystem and a solution dosing subsystem.

Typically, the water supply subsystem includes an inlet hose receiving a pressurized flow of water from a tap via an electrically controlled inlet valve and an outlet device, which directs the pressurized water flow into the cat toilet bowl unit. The water supply subsystem also includes a water level sensing assembly including a pressure sensor water inlet cup, coupled via an air line to a normally closed air pressure operated switch, which senses the level of liquid in the cat toilet bowl unit and closes the electrically controlled inlet valve when the level of the water in the bowl unit reaches a predetermined level.

Further in accordance with a preferred embodiment of the present invention the crushing and pumping subsystem includes a crushing motor having a rotating drive shaft to which is connected a crushing impeller and a pumping motor, having a rotating drive shaft to which is connected a pumping impeller.

Preferably, the crushing impeller crushes cat feces into pieces sufficiently small as to fit through a filtering separation. Additionally, the cat litter is not crushed by the crushing impeller.

Further in accordance with a preferred embodiment of the present invention the cat litter collides with and travels along the filter separation and thus clean the filter separation by removing therefrom feces and other residues which may have collected thereat and would otherwise inhibit the flow of dirty water and cat feces through the filtering separation.

Still further in accordance with a preferred embodiment of the present invention the crushing and pumping subsystem includes a filtering separation defined by the cat toilet bowl together with the multifunctional assembly.

Preferably, the filtering separation is of a tapered extend.

Additionally in accordance with a preferred embodiment of the present invention the filtering separation is sufficiently small as to prevent cat litter particles from passing therethrough.

Further in accordance with a preferred embodiment of the present invention the system also includes a cat litter dryer.

Typically, the solution dosing subsystem pumps a liquid from a solution container to the cat toilet bowl unit for enhancing cleaning and deodorizing of the cat litter.

There is also provided in accordance with a preferred embodiment of the present invention a feline excretia processing and elimination system, which includes a cat toilet bowl unit, a multifunctional assembly cooperative with the cat toilet bowl unit for separating cat feces and urine from the reusable cat litter and flushing the cat feces and urine from the cat toilet bowl unit, the multifunctional assembly including a filter separation, for use in reusable cat litter granules, the granules being are not normally crushable by operation of the multifunctional assembly and which are sized and configured such as not to pass through the filtering separation and not to become stuck therein, thus clogging the filtering separation.

There is additionally provided in accordance with a preferred embodiment of the present invention a method of manufacture of non-crushable, re-usable cat litter granules, the method including:

mixing a plastic material and clay;

extruding the mixture of plastic material and clay into a filament;

solidifying the filament; and separating the filament into non-crushable, re-usable cat litter granules.

Preferably, the mixing step also includes adding a deodorizing material.

There is additionally provided in accordance with a preferred embodiment of the present invention, non-crushable, re-usable cat litter granules including a mixture of at least a plastic material and clay.

Preferably, the mixture includes a plastic material, an elastomer and clay.

Preferably, the mixture also includes a deodorizing material.

There is additionally provided in accordance with a preferred embodiment of the present invention, for use in a feline excretia processing and elimination system including a cat toilet bowl unit and a multifunctional assembly cooperative with the cat toilet bowl unit for separating cat feces and urine from reusable cat litter and flushing the cat feces and urine from the cat toilet bowl unit, a consumable liquid subsystem including:
  a consumable liquid container; and
  an outlet valve mounted on the consumable liquid container and being openable upon engagement of the consumable liquid subsystem with the multifunctional assembly.

Preferably, the outlet valve is arranged to be engaged by an engagement protrusion forming part of a socket into which the consumable liquid container and outlet valve are arranged to be mounted on the multifunctional assembly.

Preferably, the outlet valve and the socket cooperative to provide at least one of interlock functionality, metering functionality, liquid exhaustion interlock functionality and liquid exhaustion notification functionality.

There is additionally provided in accordance with a preferred embodiment of the present invention a feline excretia processing and elimination method comprising:

placing reusable cat litter in a cat toilet bowl unit; and separating cat feces and urine from said reusable cat litter and flushing said cat feces and urine from said cat toilet bowl unit at presettable times.

Preferably, the separating includes at least one of:

mechanically engaging the cat feces and the reusable cat litter together, whereby the cat feces is broken down into small pieces and the reusable cat litter is not reduced in size;

circulating the cat feces and the reusable cat litter together along an inclined surface of the cat toilet bowl unit;

simultaneously crushing the cat feces and separating crushed cat feces from the reusable cat litter;

receiving a pressurized flow of water from a tap via an electrically controlled inlet valve and directing the pressurized water flow into the cat toilet bowl unit; and sensing a water level within the cat toilet bowl unit and automatically terminating supply of water to the bowl unit when the water level reaches a predetermined level.

Preferably, the circulating causes the cat litter to collide with and travel along a filter and thus clean the filter by removing therefrom feces and other residues which may have collected thereat and would otherwise inhibit the flow of cat feces through the filter.

The method may also include at least one of:

drying the cat litter after cleaning thereof; and pumping a liquid from a solution container to the cat toilet bowl unit for enhancing cleaning and deodorizing of the cat litter.

Preferably, the solution container includes an outlet valve which is openable upon engagement of the consumable liquid container with a suitable socket.

In accordance with a preferred embodiment of the present invention, the outlet valve is engaged by an engagement protrusion forming part of a socket into which the consumable liquid container and outlet valve are arranged to be mounted.

Preferably, the outlet valve and the socket cooperative to provide interlock functionality and/or metering functionality.

BRIEF DESCRIPTION OF THE DRAWINGS AND APPENDIX

The present invention will be understood and appreciated more fully from the following detailed description in which:

FIGS. 1C and 1D are simplified pictorial illustrations of the feline excretia processing and elimination system of FIGS. 1A and 1B and including a cover showing front facing and back facing views respectively;

FIGS. 2A and 2B are simplified exploded view pictorial illustrations of a feline excretia processing and elimination system constructed and operative in accordance with a preferred embodiment of the present invention, showing front facing and back facing views respectively;

FIGS. 7A and 7B are illustrations of the water supply subsystem of FIG. 6 in two alternative operative orientations;

FIG. 9 is a simplified exploded view pictorial illustration of a crushing and filtering chamber and a pumping chamber forming part of the crushing and pumping subsystem of FIG. 8.

FIGS. 10A and 10B are simplified sectional illustrations taken respectively along lines XA—XA and XB—XB in FIG. 8 showing an aspect of the operation of the crushing subsystem of FIGS. 8 & 9;

Appendix A is a software listing in hexadecimal form of software suitable for operating the multifunctional assembly when installed in accordance with installation instructions set forth hereinbelow:

1. Provide a CPU-microprocessor model AT89C52 package PLCC available from ATMEL Inc.;
2. Run the commonly available burn-in software using the compiled source file "PNPN36D.HEX" as input (APPENDIX A) and burn the compiled source file "PNPN36D.HEX" into the internal memory of the AT89C52 microprocessor mentioned in step 1;
3. The chosen logic voltage is 5V;
4. Place the burnt-CPU chip prepared in step 2 as the controller unit U1 (FIG. 2C) into the electrical panel of the multifunctional assembly; and
5. Assemble the electrical panel as described mentioned in step 4 to multifunctional assembly.

DETAILED DESCRIPTION OF PREFERRED EMBODIMENTS

Figure 1A:
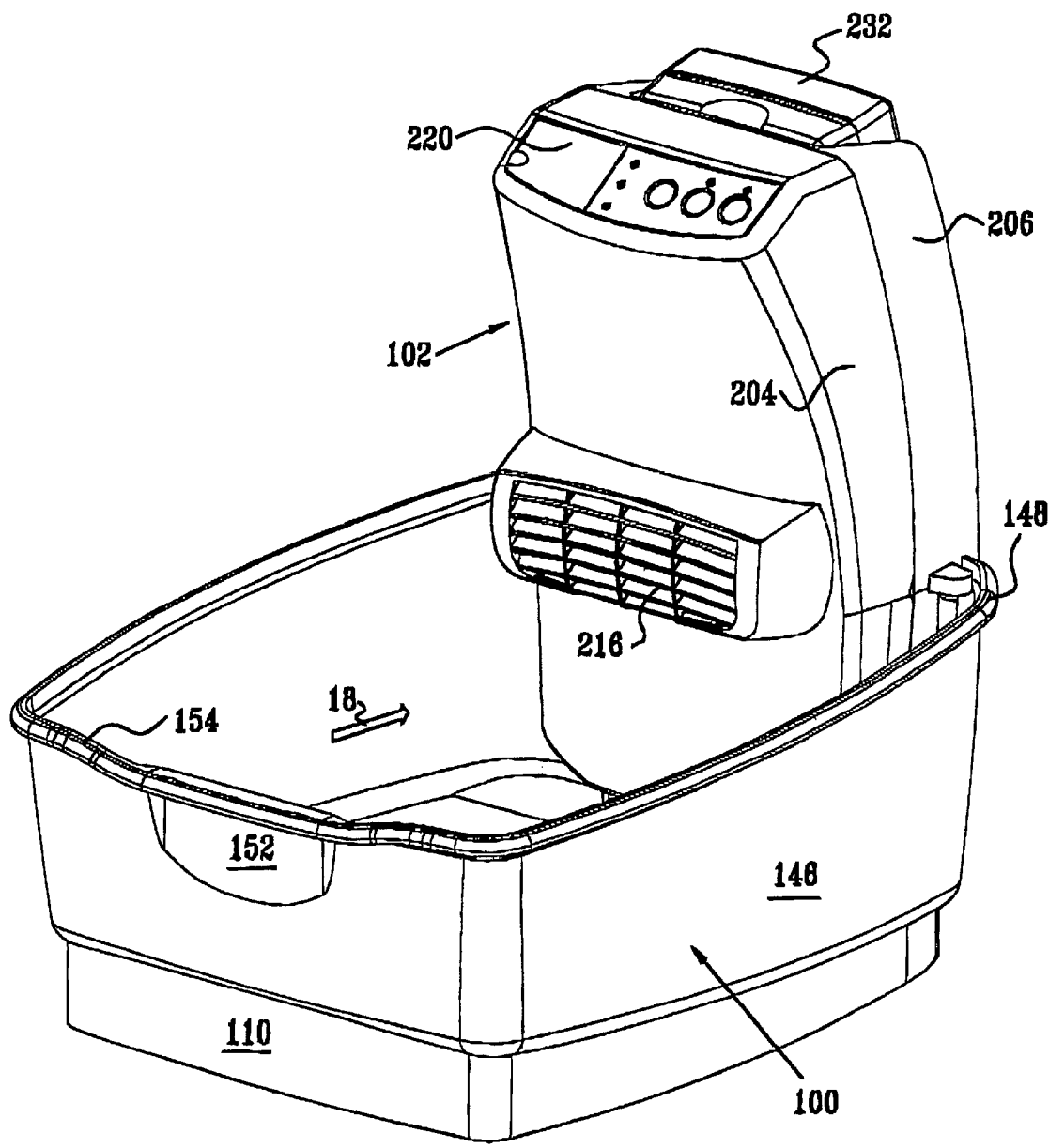
FIGS. 1A and 1B are simplified pictorial illustrations of a feline excretia processing and elimination system constructed and operative in accordance with a preferred embodiment of the present invention, showing front facing and back facing views respectively.
Figure 1B:
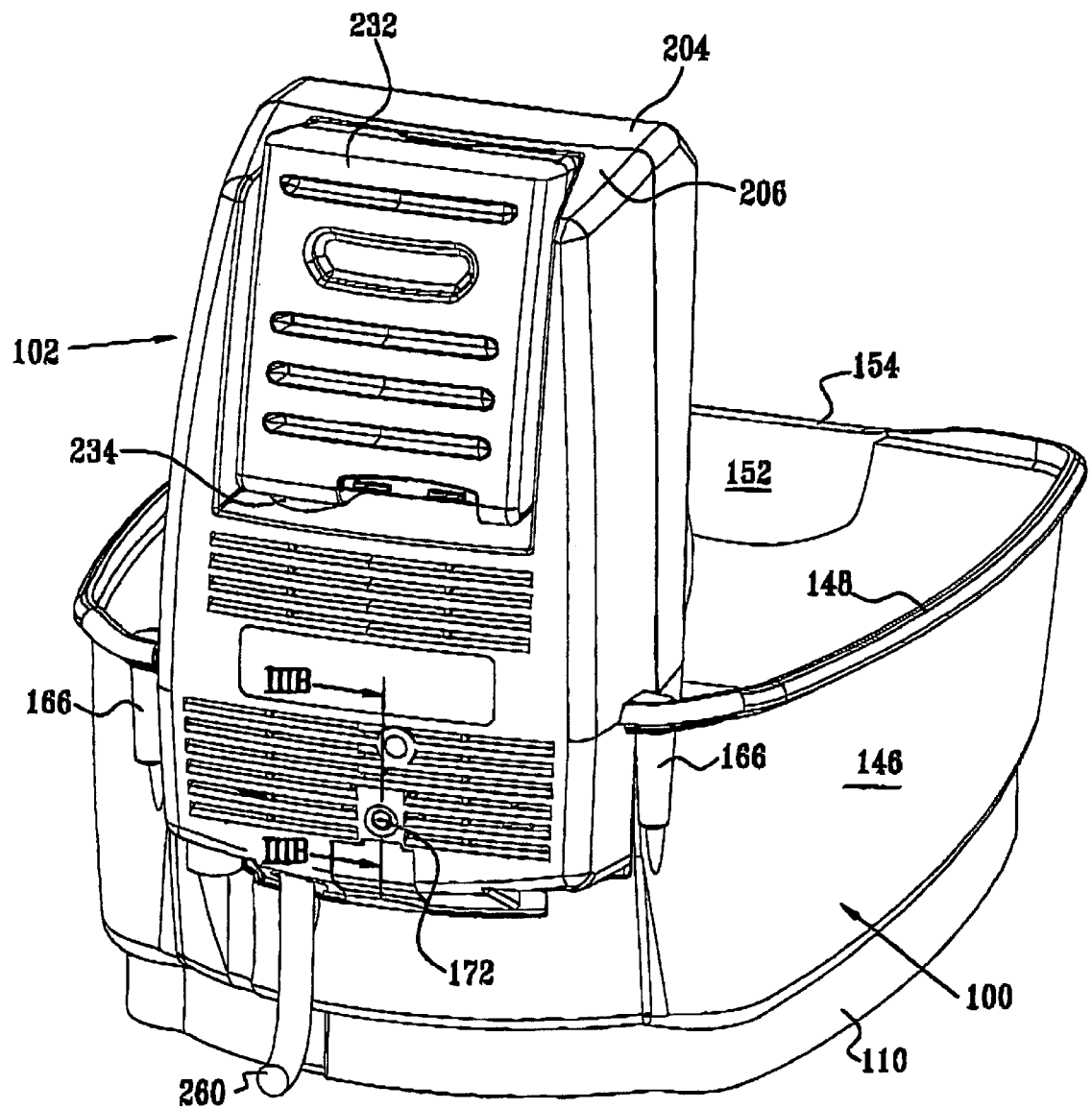
Figure 1D:
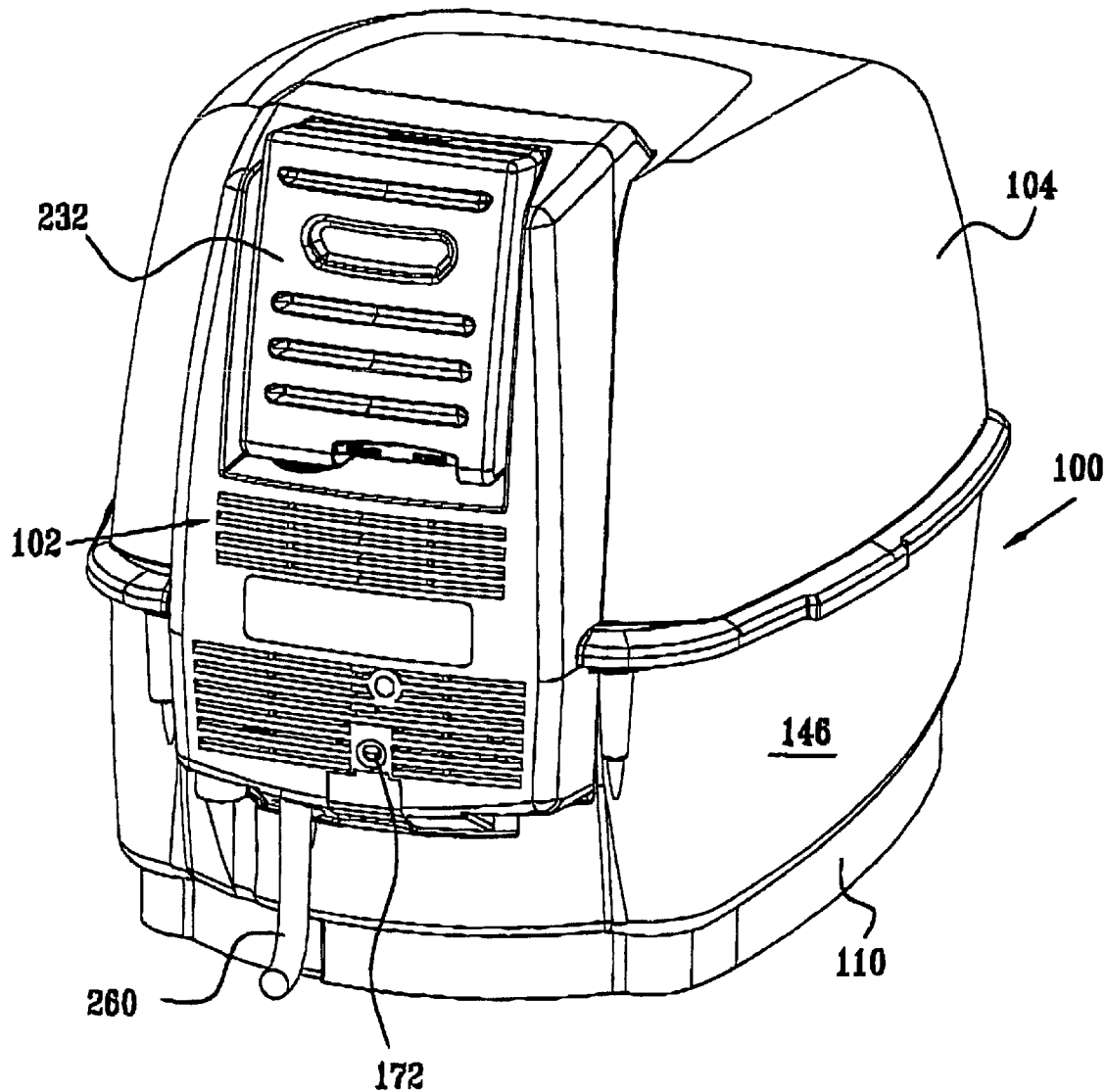
Figure 2A:
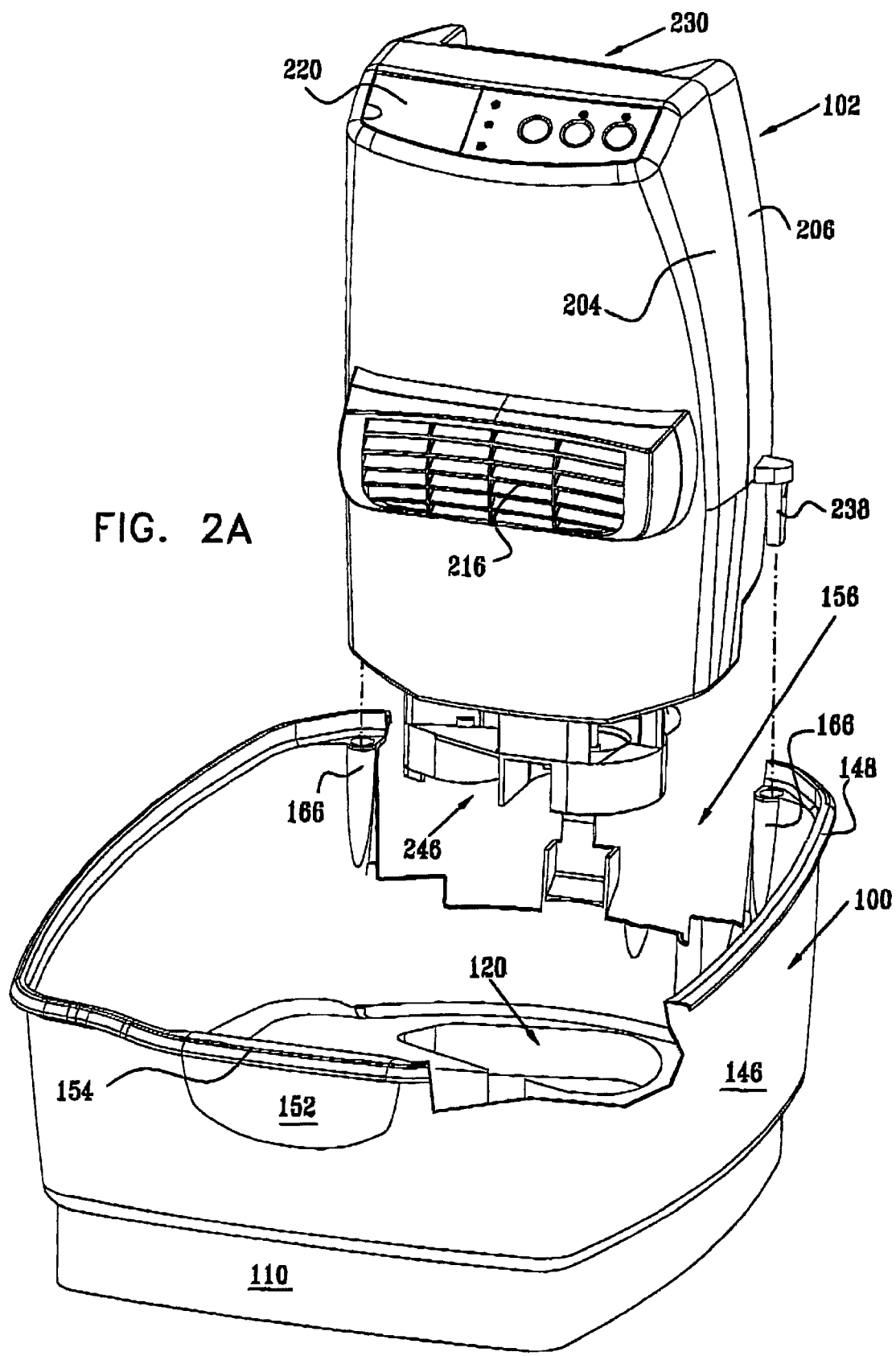

Reference is now made to FIGS. 1A & 1C and 1B and 1D, which are simplified pictorial illustrations of a feline excretia processing and elimination system constructed and operative in accordance with a preferred embodiment of the present invention, showing front facing and back facing views respectively and to FIGS. 2A and 2B, which are simplified exploded view pictorial illustrations of a feline excretia processing and elimination system constructed and operative in accordance with a preferred embodiment of the present invention, showing front facing and back facing views respectively.

As seen in FIGS 1A–2B, the feline excretia processing and elimination system of the present invention includes a cat toilet bowl unit 100 preferably molded of plastic as a single piece and a multifunctional assembly 102 removably and lockably mounted thereto and cooperative therewith. FIGS. 1C and 1D correspond to FIGS. 1A and 1B respectively and show the system including a cover 104 having a cat ingress and egress opening 106.

Figure 4A:
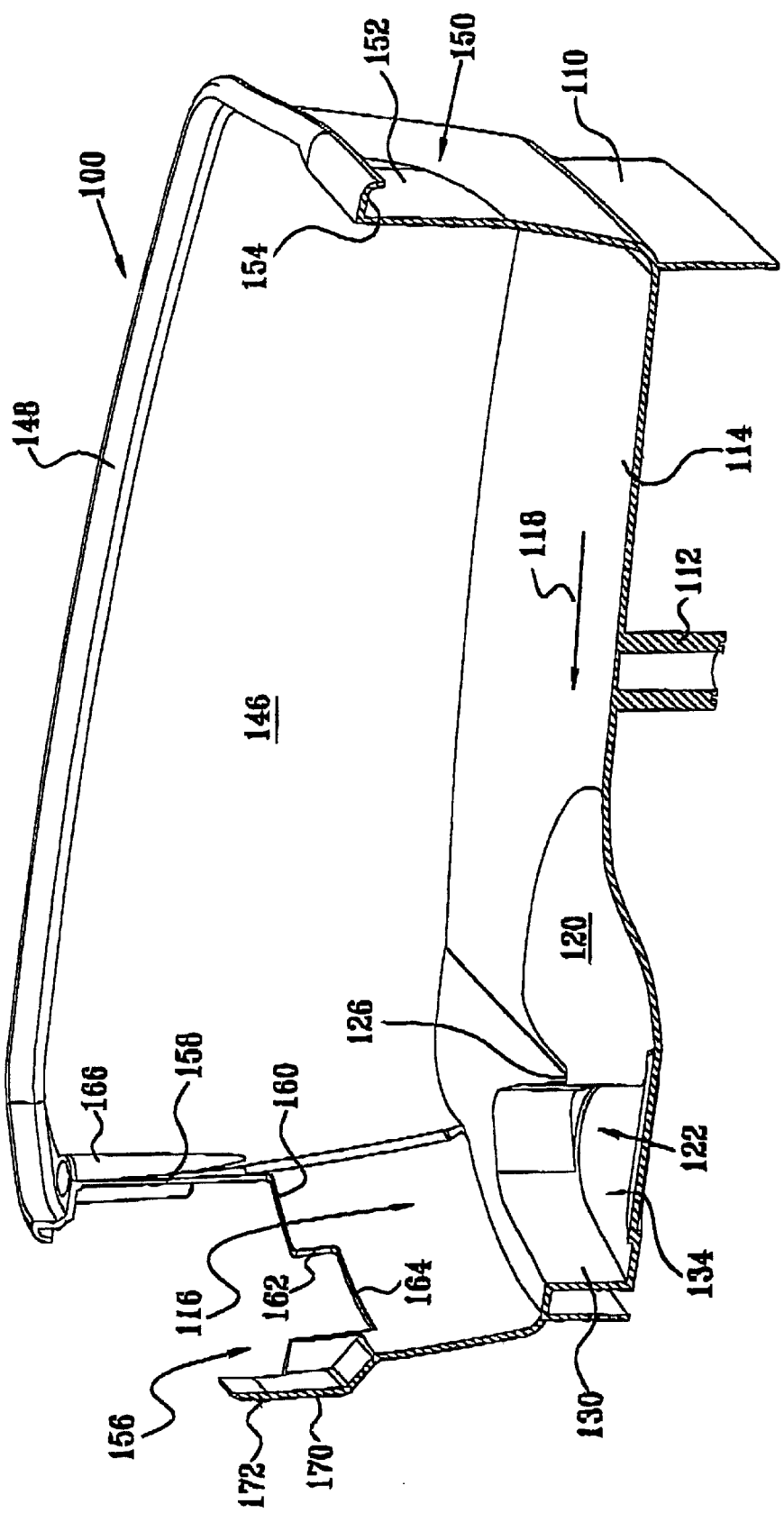
FIGS. 4A and 4B are simplified sectional illustrations of a cat toilet bowl unit, forming part of the system of FIGS. 1–2B, taken along respective lines IVA—IVA and IVB—IVB in FIG. 2B.
Figure 4B:
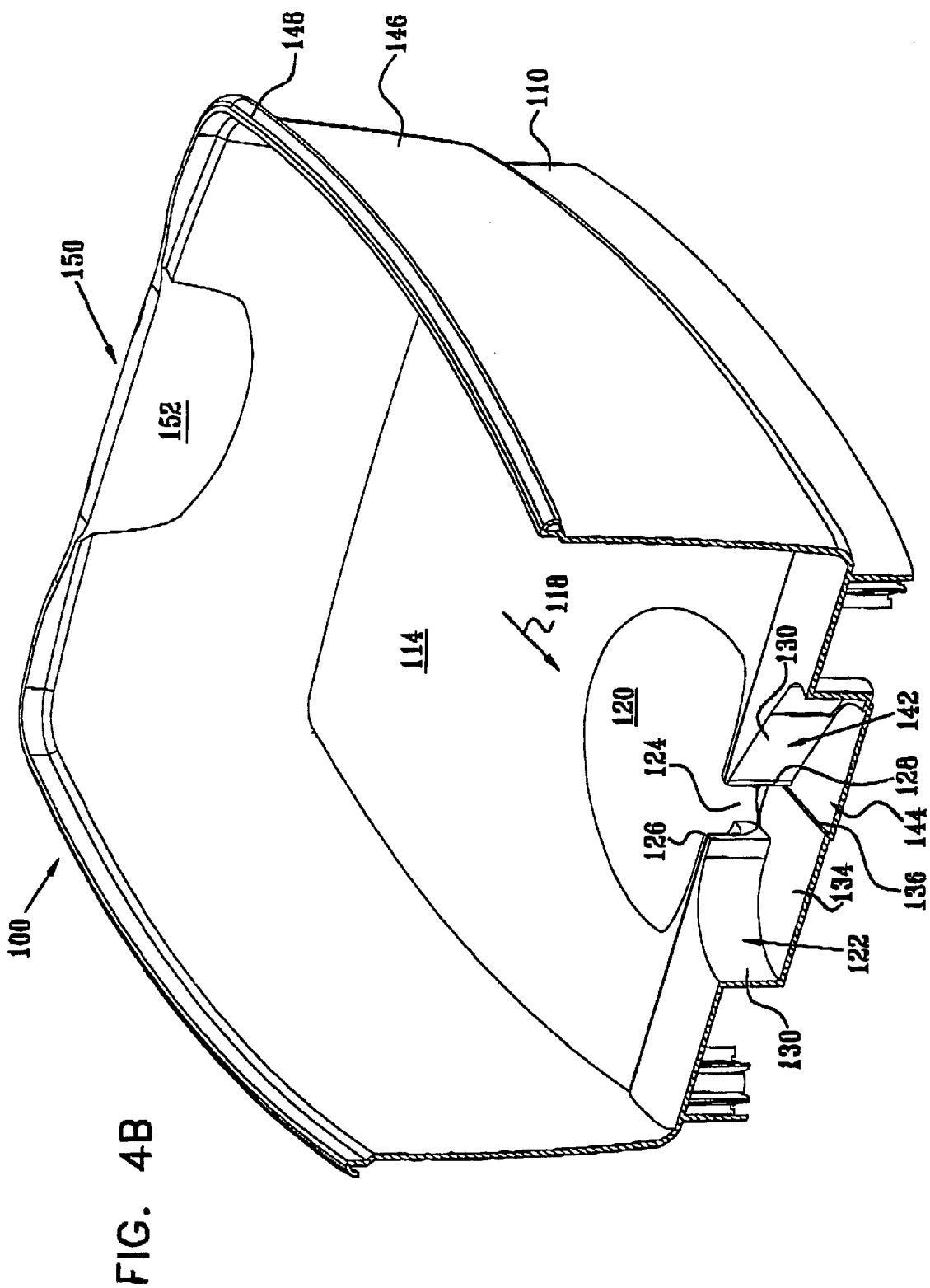

Turning additionally to FIGS. 4A and 4B, which are simplified sectional illustrations of a cat toilet bowl unit, forming part of the system of FIGS. 1–2B, taken along respective lines IVA—IVA and IVB—IVB in FIG. 2B, it is seen that the cat toilet bowl unit 100 preferably comprises a generally peripheral base portion 110 and a central support portion 112 which are arranged to be supported on a generally flat and level surface (not shown). The base portion 110 and the central support portion 112 support a bottom bowl surface 114, which is generally inclined downwardly towards a rear portion 116 of the bowl unit 110, in the sense of FIG. 1A, the general direction of incline being designated by an arrow 118. A preferred downward angle of incline is approximately 2–3 degrees from the horizontal (FIG. 4A).

The bottom bowl surface 114 (FIG. 4B) is preferably formed with a recess 120 of increasing depth in the general direction indicated by arrow 118, which leads into a crushing and filtering chamber housing 122, via an opening 124, defined by mutually spaced upstanding wall portions 126 and 128.

Crushing and filtering chamber housing 122 is partially defined by a peripheral wall 130 and by a floor 134. Crushing and filtering chamber housing 122 cooperates with elements of the multifunctional assembly 102 to define a crushing and filtering chamber, as will be described hereinbelow in detail.

Adjacent crushing and filtering chamber housing 122 there is preferably provided a pumping chamber housing 142. Pumping chamber housing 142 is partially defined by peripheral wall 130 and by a floor 144, which lies slightly below floor 134 and preferably defines therewith a shoulder 136. Pumping chamber housing 142 cooperates with elements of the multifunctional assembly 102 to define a pumping chamber, as will be described hereinbelow in detail.

Extending above bottom bowl surface 114 is a generally upstanding peripheral bowl side wall 146, which preferably terminates in a bent over peripheral rim 148. At a front portion 150 of the cat toilet bowl unit 100 there is preferably provided a recess 152 in side wall 146 to serve as a hand-hold, preferably rim 148 is widened above recess 152 to define a finger engagement recess 154.

At the rear portion 116 of the cat toilet bowl unit 100, peripheral side wall 146 is preferably provided with a cut-out 156. Cut-out 156 is preferably defined by generally symmetrically placed vertical side edges 158, extending to generally horizontal side edges 160, which, in turn, extend inwardly to downwardly extending vertical edges 162, which terminate at a central horizontal edge 164. Disposed adjacent vertical side edges 158, there are preferably provided pin sockets 166, for accommodating locating pins of the multifunctional assembly 102.

Preferably a flexible upstanding locking element 170 is extends upwardly from central horizontal edge 164 and includes a protrusion 172 for removable locking engagement with a suitable locking socket formed on multifunctional assembly 102.

Figure 5:
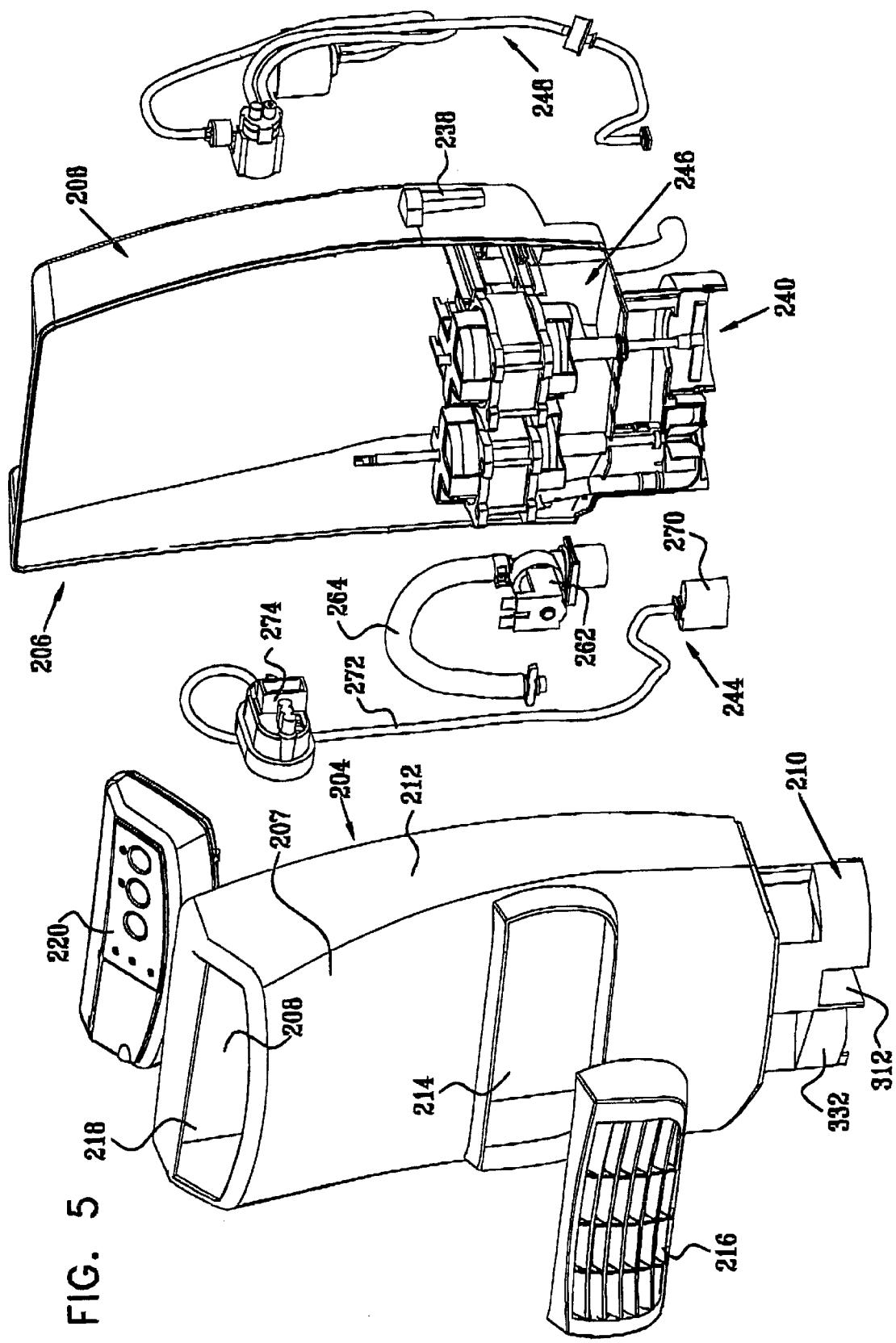
FIG. 5 is a simplified exploded view illustration of a multifunctional assembly useful in conjunction with the cat toilet bowl unit of FIGS. 4A and 4B in the system of FIGS. 1–2B.

Reference is now additionally made to FIG. 5, which is a simplified exploded view illustration of multifunctional assembly 102.

Multifunctional assembly 102 preferably comprises a two-part molded plastic housing, including a forward facing housing portion 204 and a rearward facing housing portion 206. Forward facing housing portion 204 preferably defines a front face 207, a top face 208, a lower partial chamber defining portion 210 and side panels 212. The front face 207 preferably defines an aperture 214 for accommodating a dryer outlet grill 216, while top face 208 preferably defines an aperture 218 for accommodating a user interface panel 220.

Rearward facing housing portion 206 preferably defines at an outer surface thereof, as seen particularly in FIG. 2B, a solution container receiving recess 230 for receiving and retaining a solution container subsystem 232 (FIG. 1B), a solution container interface socket 234 and a solution container retaining protrusion 236. Rearward facing housing portion 206 also preferably defines locating pins 238 for removable engagement with sockets 166 formed on cat toilet bowl 100, a lower partial chamber defining portion 240, cooperating with lower partial chamber defining portion 210, and side panels 242, as well as supports for various subsystems which will be described hereinbelow in detail.

Mounted between forward facing housing portion 204 and rearward facing housing portion 206 are a water supply subsystem designated generally by reference numeral 244, a crushing and pumping subsystem designated generally by reference numeral 246 and a solution dosing subsystem designated generally by reference numeral 248.

Figure 3A:
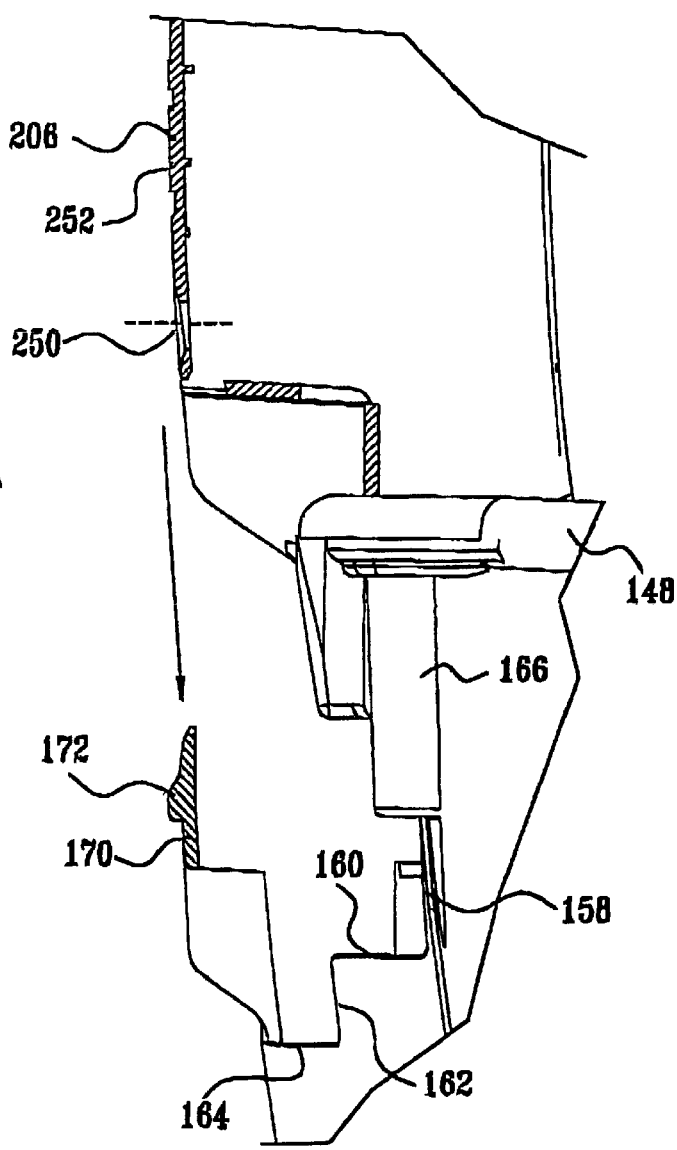
FIGS. 3A and 3B are simplified sectional illustrations taken along lines IIIA—IIIA and IIIB—IIIB in FIGS. 2B and 1B, respectively, illustrating a locking mechanism employed in the system of FIGS. 1A–2B, in respective unlocked and locked orientations.
Figure 3B:
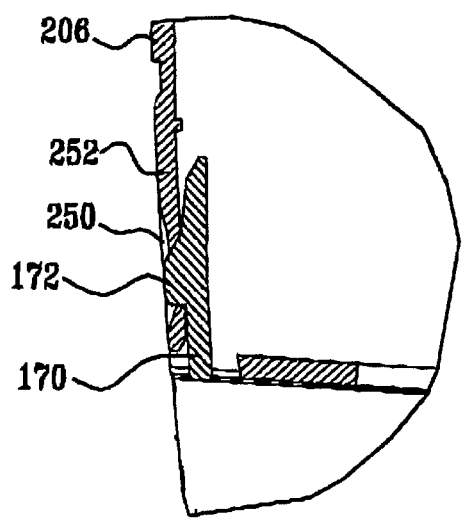

Reference is now made additionally to FIGS. 3A and 3B, which are simplified sectional illustrations taken along lines IIIA—IIIA and IIIB—IIIB in FIGS. 2B and 1B, respectively, illustrating a locking mechanism employed in the system of FIGS. 1A–2B. As seen with particularity in FIGS. 3A and 3B, the protrusion 172 defined by locking element 170 of cat toilet bowl 100 removably lockingly engages an aperture 250 in a locking surface 252 formed on a portion of rearward facing housing portion 206.

Typically locking engagement between protrusion 172 and aperture 250, and thus between the multifunctional assembly 102 and the cat toilet bowl 100, takes place automatically when the multifunctional assembly 102 is fully seated in cat toilet bowl 100 and locating pins 238 are fully seated in sockets 166. Unlocking of the multifunctional assembly 102 from the cat toilet bowl 100 may be readily effected by manually pressing the protrusion 172 in a forward direction in a direction generally opposite to that of arrow 118 (FIG. 1A), out of engagement with aperture 250.

Engagement of the protrusion 172, preferably with the aperture 250, also operate an internal electrical safety interlock switch (not shown) for turning off electrical power when the multifunctional assembly 102 is removed from the bowl unit 100, to ensure the safety of the users.

Figure 6:
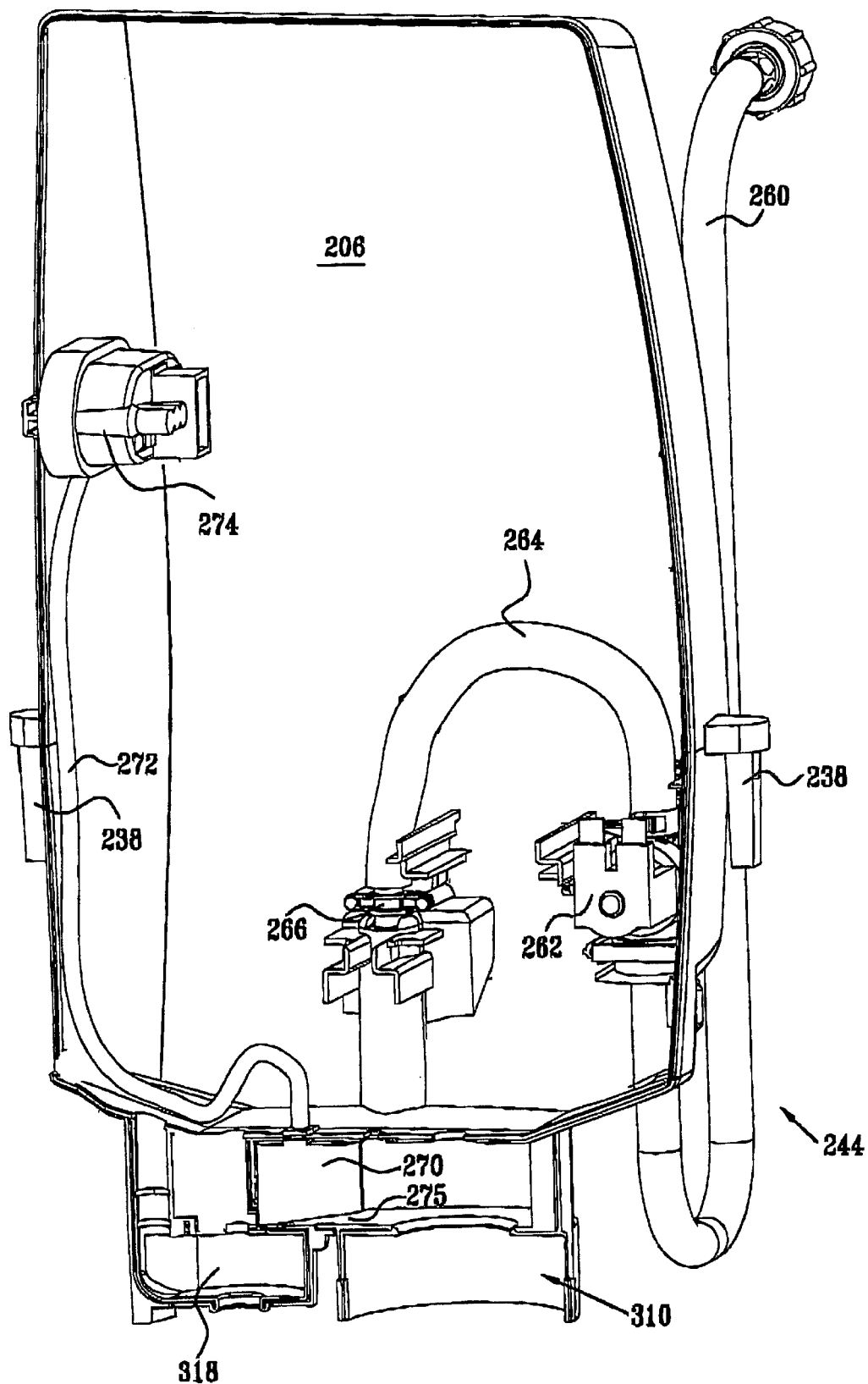
FIG. 6 is a partially cut away simplified pictorial illustration of a water supply subsystem forming part of a multifunctional assembly which is part of the system of FIGS. 1–2B.

Reference is now made to FIG. 6, which is a partially cut away simplified pictorial illustration of water supply subsystem 244, forming part of the multifunctional assembly 102. As seen in FIG. 6, water from a tap (not shown) is received via an inlet house 260 which is connected via an electrically controlled inlet valve 262 to an internal supply hose 264, which is, in turn, connected to an outlet device 266, which directs a pressurized water flow into the cat toilet bowl unit 100. Electrically controlled inlet valve 262 controls the supply of pressurized water to the cat toilet bowl unit 100.

Figure 8:
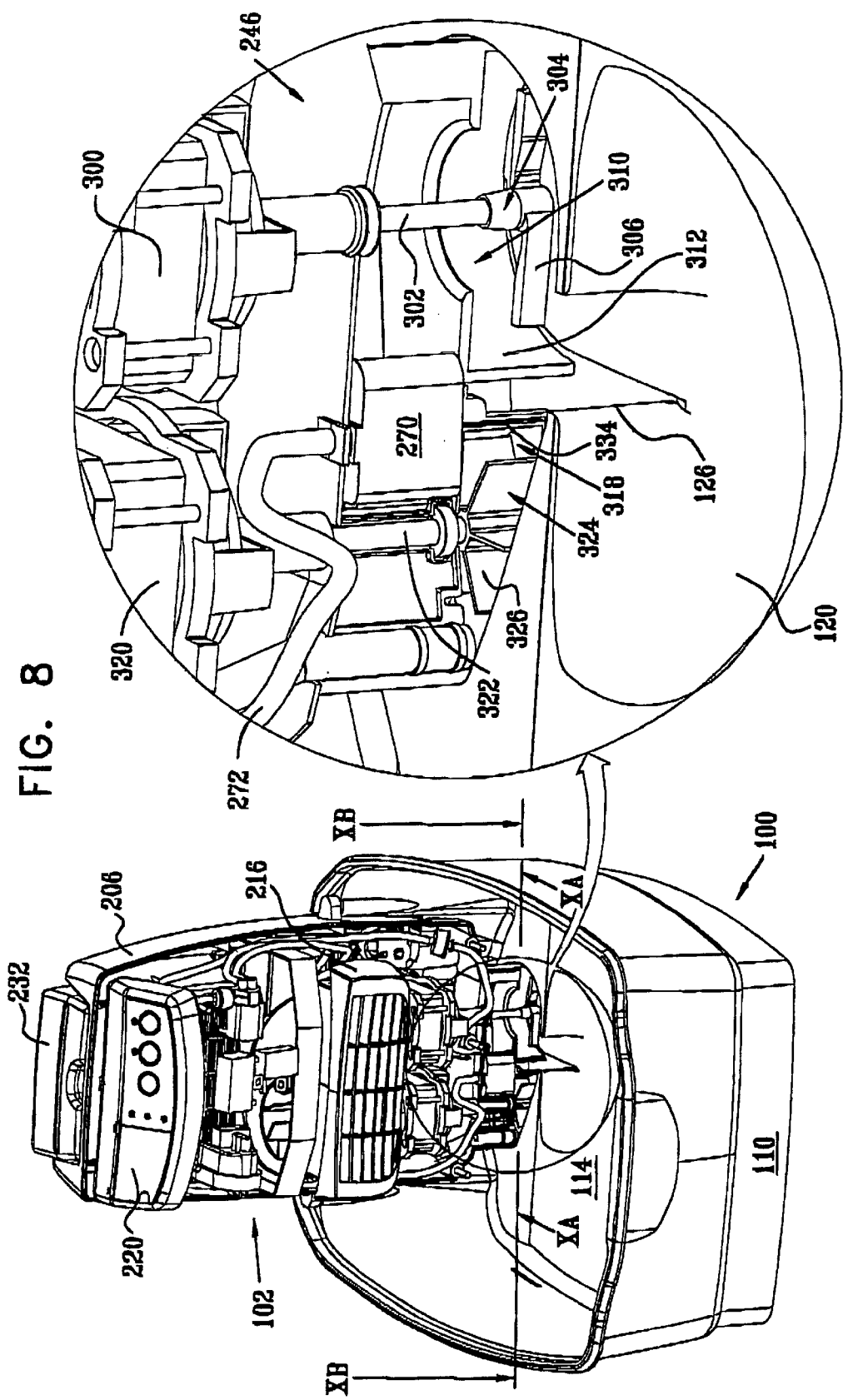
FIG. 8 is a partially cut away simplified pictorial illustration of a crushing and pumping subsystem forming part of the multifunctional assembly of FIG. 5, positioned in the cat toilet bowl unit of FIGS. 4A and 4B.

A water level sensing assembly, typically comprising a pressure sensor water inlet cup 270, coupled via an air line 272 to a normally closed air pressure operated switch 274, senses the level of the water in the cat toilet bowl unit 100 and closes electrically controlled inlet valve 262 when the level of the water in the bowl unit 100 reaches a predetermined level. Water enters the pressure cup 270 via a typically triangularly shaped gap 275 located between the base of the pressure cup 270 and the tops of the crushing chamber 310 and pumping chamber 318 (FIGS. 8 and 9). The gap 275 is shaped such that the opening of cup 270 faces in the direction of the feces, urine and litter granules as described hereinbelow with respect to FIGS. 11A, 11B and 12.

Alternatively, the water level sensing assembly may be replaced by a other water level sensors, as is known in the art.

Reference is now made to FIGS. 7A and 7B, which are illustrations of the water supply subsystem of FIG. 6 in two alternative operative orientations. As seen FIG. 7A, when a user or other input requires cleaning of the cat toilet bowl unit 100, electrically controlled valve 262 is opened by supply of electrical current thereto. Water enters the bowl unit via inlet hose 260 (FIG. 6), valve 262, hose 264 and outlet device 266. As the water rises in bowl unit 100, it reaches the inlet of the cup 270 and begins to compress the air within cup 270, as indicated by arrows in the air line 272. The pressure of the air within cup 270 continues to increase as the water level within the bowl unit 100 rises, until a predetermined water level is reached. At this level, the air pressure within air line 272 is sufficiently high to cause pressure operated switch 274 to open and thus to interrupt the supply of current to electrically controlled inlet valve 262, thus closing the valve 262 and thereby terminating supply of water into the bowl unit 100, as indicated in FIG. 7B.

Reference is now made to FIG. 8, which is a partially cut away simplified pictorial illustration of a crushing and pumping subsystem 246 forming part of the multifunctional assembly of FIG. 5, positioned in the cat toilet bowl unit 100 of FIGS. 4A and 4B and to FIG. 9, which is a simplified exploded view pictorial illustration of a crushing and filtering chamber and a pumping chamber forming part of the crushing and pumping subsystem of FIG. 8. As seen in FIGS. 8 & 9, the crushing and pumping subsystem 246 comprises a crushing motor 300 having a rotating drive shaft 302 to which is connected a crushing impeller 304 having a pair or relative narrow width, generally flat vanes 306.

Impeller 304 is preferably characterized in that the radially outward extent of vanes 306 is spaced from the side walls of a crushing and filtering chamber 310 which is defined interiorly of crushing and filtering chamber housing 122 (FIG. 4B), partially by a peripheral back wall 312 forming part of lower partial chamber defining portion 240 (FIG. 5) and partially by a peripheral front wall 210 (FIG. 5) forming part of lower partial chamber defining portion 240 (FIG. 5), as well as by floor 134 (FIG. 4B). A dividing wall 316, which is a portion of the back wall 312, divides between the crushing and filtering chamber 310 and an adjacent pumping chamber 318.

The crushing and pumping subsystem 246 also comprises a pumping motor 320, having a rotating drive shaft 322 to which is connected a pumping impeller 324, having multiple radially extending vanes 326 of width greater than that of vanes 306.

Impeller 324 is preferably characterized in that the radially outward extent of vanes 326 is spaced by a distance less than the corresponding spacing of vanes 306, from the side walls of pumping chamber 318 which is defined interiorly of pumping chamber housing 142 (FIG. 4B), partially by a peripheral front wall 332 forming part of lower partial chamber defining portion 210 (FIG. 5) and partially by a peripheral back wall 334 forming part of lower partial chamber defining portion 312 (FIG. 5), as well as by a floor portion 336 forming part of portions 210 and 240 and spaced from floor 144 (FIG. 4B). An air ventilation outlet 349 (FIG. 10A) is located at the top of the pumping chamber 318 for venting excess air flowing through the pumping chamber 318, which could otherwise interference with proper operation of the pumping chamber 318. In order to enhance the efficiency of operation of the pumping chamber 318, chamber 318 is preferably located at the lowest point in the cat toilet bowl unit 100, thus ensuring that all water in unit 100 enters chamber 318 during pumping (FIG. 11C).

Reference is now made to FIGS. 10A and 10B, which are simplified sectional illustrations taken respectively along lines XA—XA and XB—XB in FIG. 8 showing an aspect of the operation of the crushing and pumping subsystem 246 of FIGS. 8 and 9. FIGS. 10A and 10B illustrate grinding and filtering action wherein cat feces 340 water and urine 342 and cat litter granules 344 are supplied from the cat toilet bowl 100 (FIG. 4A) to a supply chamber 350 and thence through an opening 32 (FIG. 11A) at the bottom of supply chamber 350 to crushing and filtering chamber 310. In chamber 310, the impeller 304 drives this mixture in centrifugal motion, thus crushing the feces into pieces sufficiently small as to fit through a filtering separation 360 defined at shoulder 136 (FIG. 4B).

The term "crushing" is intended to cover mechanically induced break-down of the feces into small pieces.

In accordance with a preferred embodiment of the present invention, the granules 344 collide with and travel along the filter separation 360 and thus clean the filter separation 360 by removing therefrom feces and other residues which may have collected thereat and would otherwise inhibit the flow of feces 340 and urine 342 through filtering separation 360 into chamber 318.

It is a particular feature of the present invention that the filtering separation 360 is defined by the precise placement of dividing wall 316 relative to shoulder 136. Preferably, the filtering separation 360 is of a tapered extent, increasing in the direction of an arrow 362. Preferably, the filtering separation is defined by the horizontal separation from the edge of floor 134 at shoulder 136 and the adjacent facing edge of wall 316. It is also a particular feature of the present invention that the filtering separation is sufficiently small as to prevent cat litter particles from passing therethrough from the crushing chamber 310 to the pumping chamber 324.

Figure 11A:
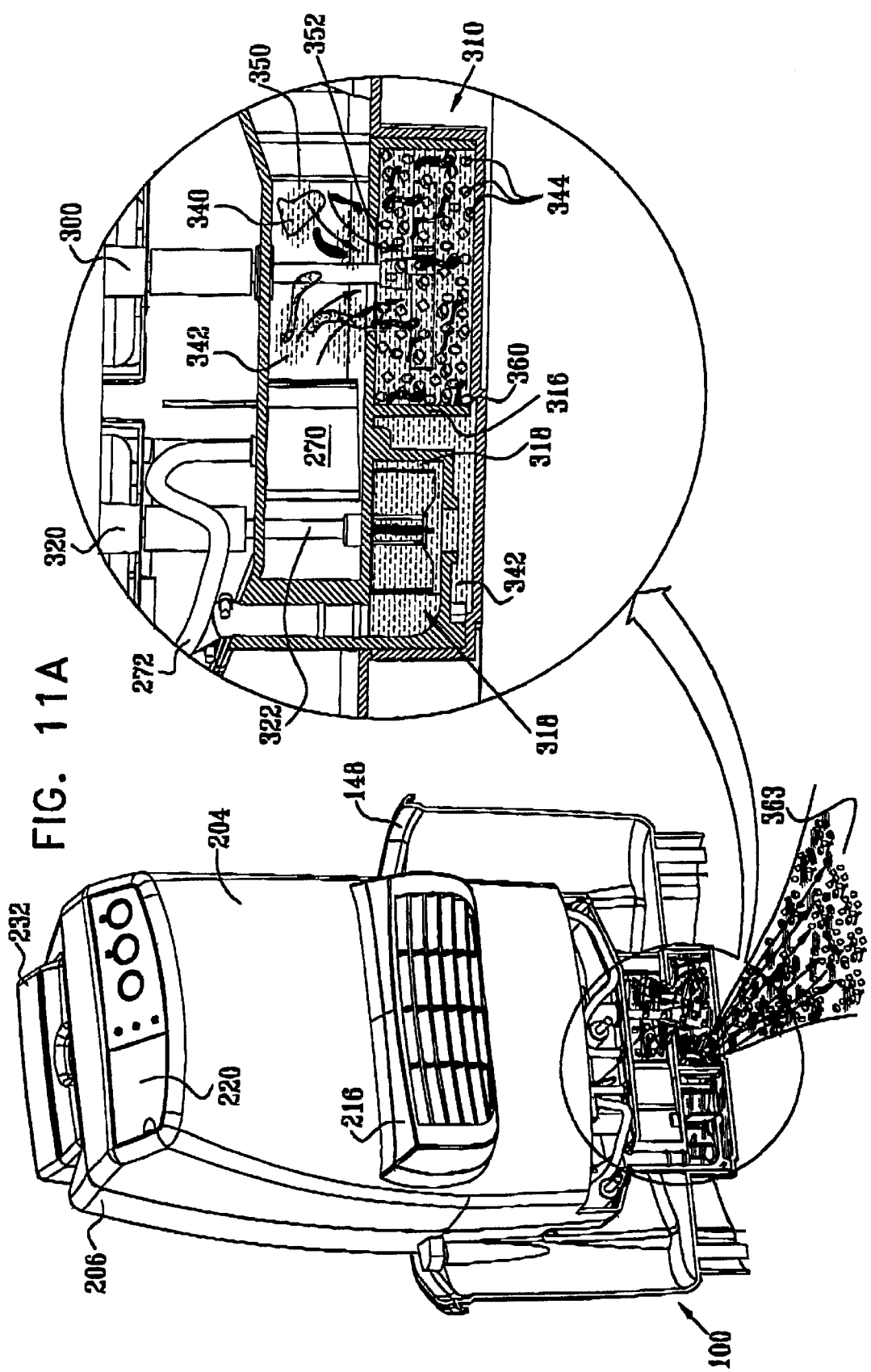
FIGS. 11A, 11B and 11C are simplified pictorial illustrations of the operation of the crushing and pumping subsystem of FIGS. 8 & 9.
Figure 11B:
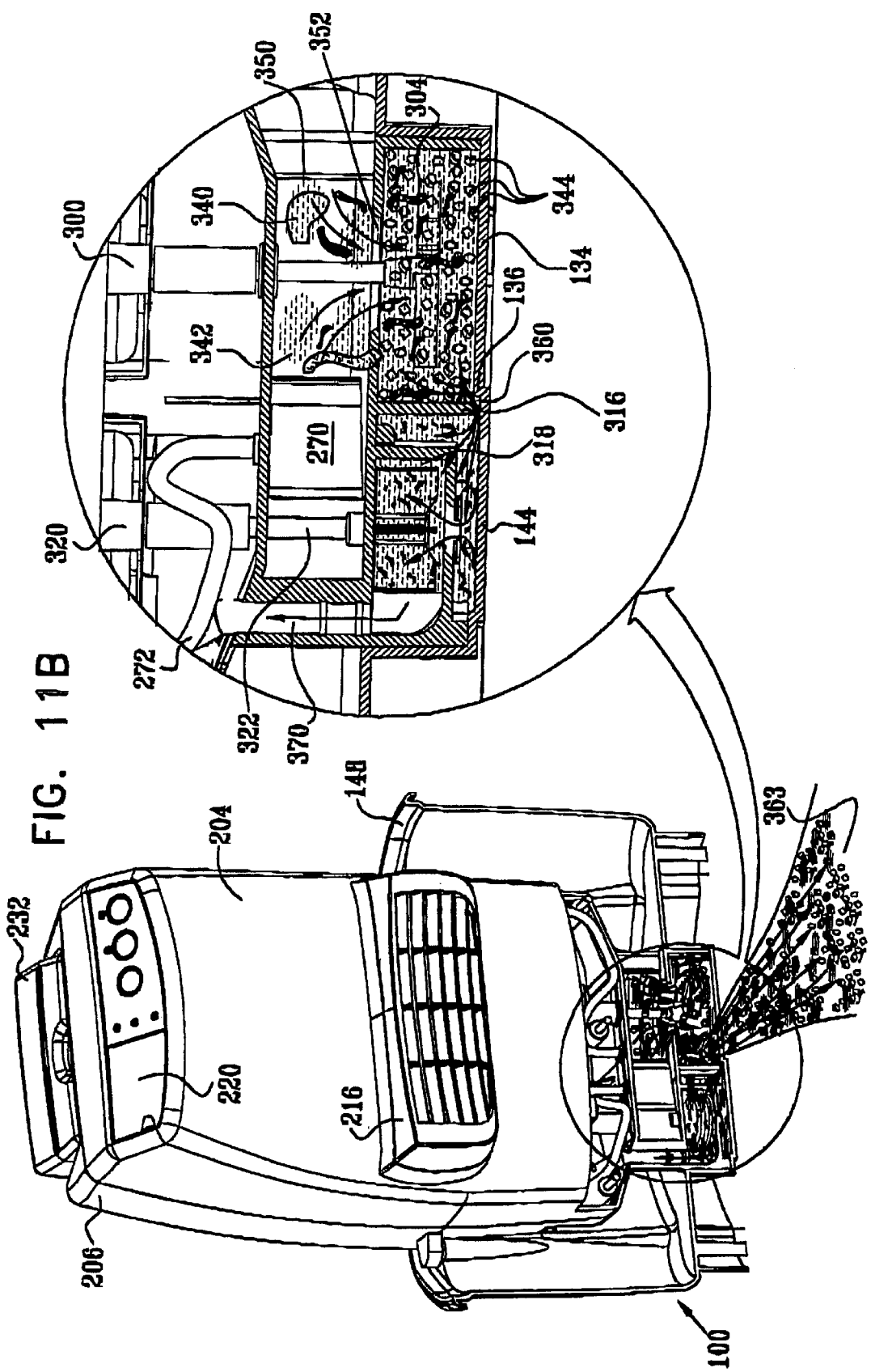
Figure 11C:
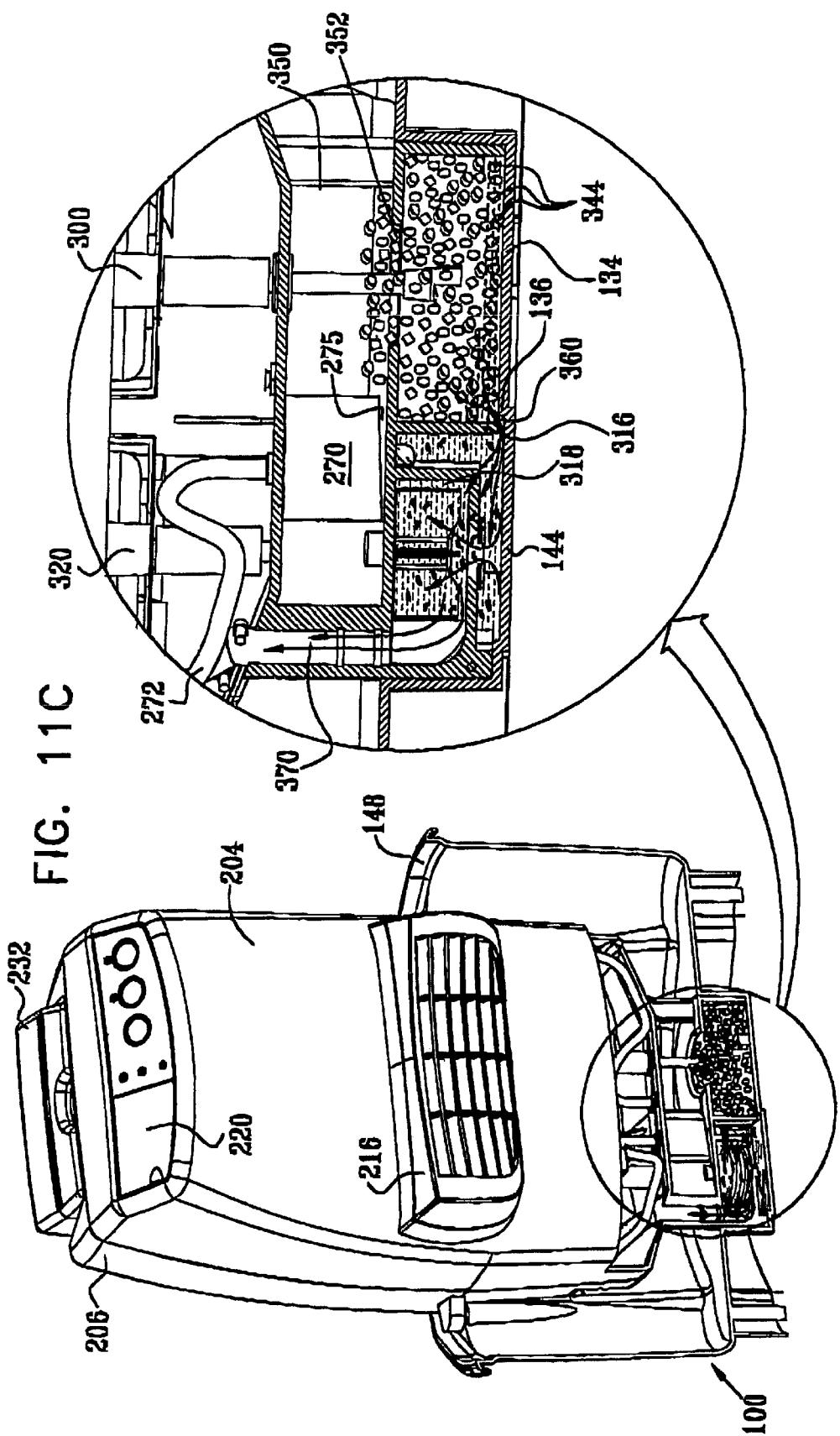
Figure 12:
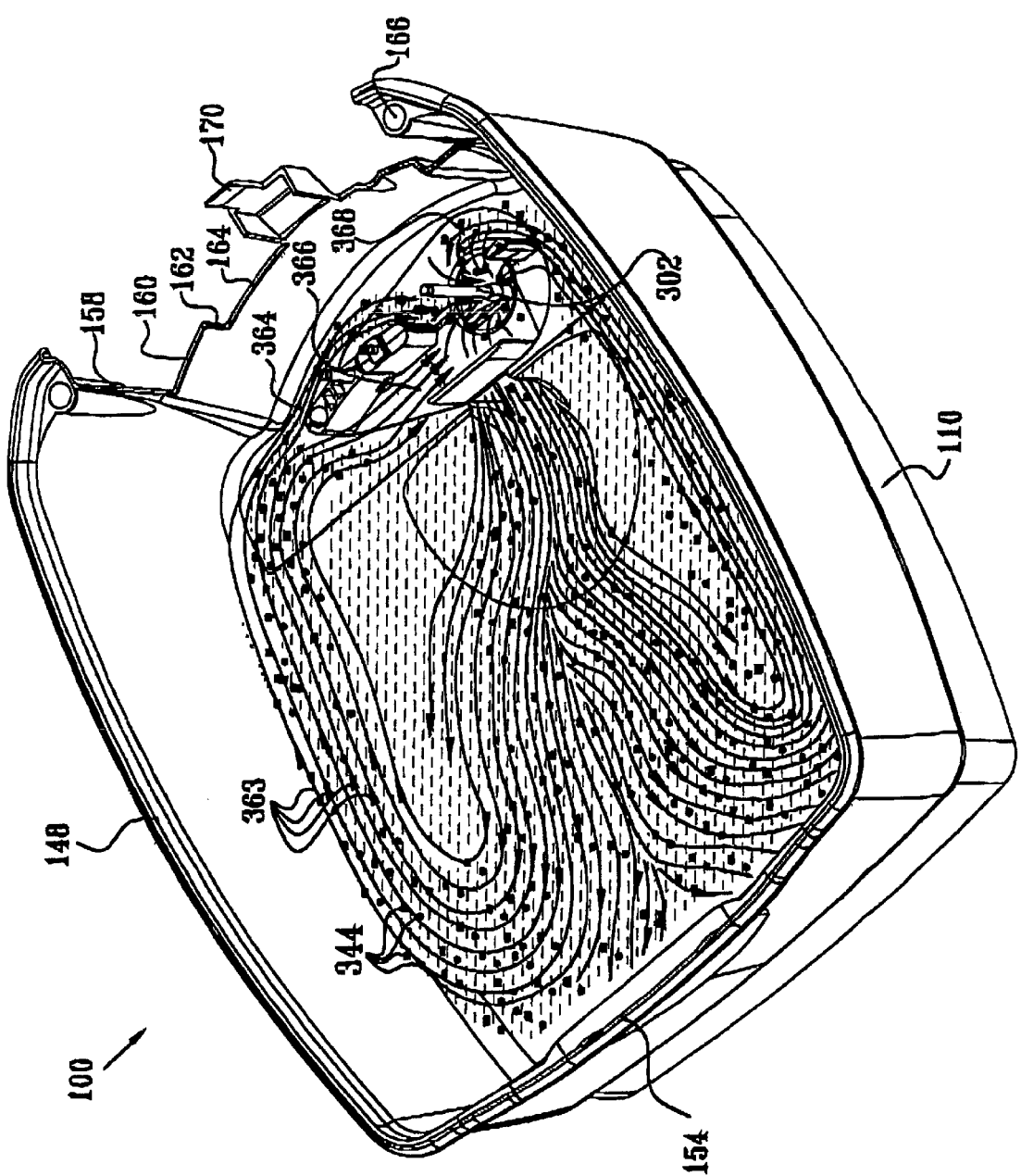
FIG. 12 is a simplified pictorial illustration of circulation of liquid and granules during stages in the operation of the crushing and pumping subsystem shown in FIGS. 11A and 11B.

Reference is now made to FIGS. 11A, 11B, 11C and 12, which are simplified pictorial illustrations of the operation of the crushing and pumping subsystem of FIGS. 8 and 9 and to FIG. 12, which is a simplified pictorial illustration of circulation of the feces 340, urine and water mixture 342 and the litter granules 344 during stages in the operation of the crushing and pumping subsystem shown in FIGS. 11A and 11B.

FIG. 11A illustrates an initial crushing stage, wherein the crushing operation takes place with minimal filtering, inasmuch as the pumping chamber 318 is filled with water. The mixture of cat litter particles 344, feces 340 and urine together with water 342 is recirculated through the filtering and crushing chamber 310 and through the cat toilet bowl 100, preferably creating a typical flow 363 configured as shown in FIG. 12.

The feces 340, urine and water 342 and litter granules 344 enter the supply chamber 350 via supply chamber inlets 364, 366 and 368 (FIG. 12). As described hereinabove with respect to FIG. 10A, the feces 340, urine and water 342 and litter granules 344, then flow into the crushing chamber 350, the crushed feces 340 exit the crushing chamber 310 together with the urine and water mixture 342 and the granules 344 and generate the flow 363 (FIGS. 11A and 12) in the cat litter bowl 100.

It is also a particular feature of the present invention that as the cat litter granules 344 circulate through the cat toilet bowl unit 100 as seen in FIG. 12, the granules 344 repeatedly engage the walls and floor of unit 100, thus providing cleaning of the interior of the cat toilet bowl unit 100. It is appreciated that the term "crushed faces" typically includes solid substances, which are water soluble and other solid substances, which are not water soluble. The water soluble substances are typically dissolved and the non-water soluble substances are typically crushed into small particles.

It is noted that during the operation of the system shown in FIG. 1A, the crushing motor 300 is in operation and the pumping motor 320 is not in operation.

The litter granules 344 as well as the remaining, not sufficiently ground feces 340, exit the crushing chamber via opening 124 (FIG. 4B) as indicated by reference numeral 363 and continue to circulate in the bowl unit 100 as seen in FIG. 12, until all of the feces 340 has been sufficiently ground so as to be able to pass through filtering separation 360 into the pumping chamber 318 and out drain pipe 370.

Reference is now made to FIG. 11B, which illustrates a second stage wherein both the crushing motor 300 and the pumping motor 320 are in operation. Feces 340, urine and water 342 and litter granules 344 flow from the supply chamber 350 into the crushing chamber 310. A portion of the feces 340, urine and water 342 and litter granules 344, typically 20% of the total flow into the crushing chamber 310, flows out of the crushing chamber via the filtering separation 360 into the pumping chamber 318. The crushed feces 340 and the urine and water 342 exit the pumping chamber 318*i* via a pumping chamber drain pipe 370 and flow into an external drainage system (not shown).

It is appreciated that during the circulation shown in FIGS. 11A and 11B, litter granules 344 repeatedly engage gap 275 at the water inlet of pressure sensor cup 270 (FIG. 6) and the ventilation opening 349 of the pumping chamber 318 (FIG. 8), thus cleaning these locations by removing feces and other residues therefrom.

Reference is now made to FIG. 11C, which shows a situation wherein the pumping motor 320 is operating and the crushing motor 320 is not operating. Crushed feces 340 as well as urine and water 342 are seen flowing through the filtering separation 360 into the pumping chamber 318. It is a particular feature of the present invention that the litter granules 344 are sized such that they cannot flow through the filtering separation 360 and are configured that they tend not to get stuck therein. Thus the litter granules 344 remain within the bowl unit 100 and the crushing chamber 310, while the crushed feces 340, water and urine 342 are drained away via pipe 370.

Granules 344, which remain within the bowl unit 100 are typically in moist state. Preferably the moist granules 344 are heated and dried, as described hereinbelow with reference to FIG. 16.

Figure 13A:
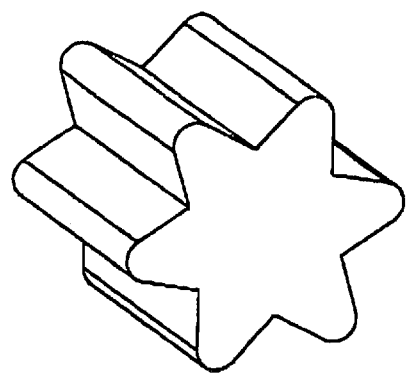
FIGS. 13A, 13B and 13C are simplified illustrations of preferred cat litter granules useful in accordance with a preferred embodiment of the present invention.
Figure 13B:
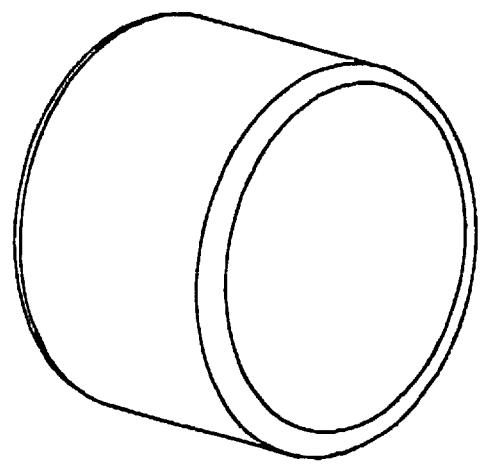
Figure 13C:
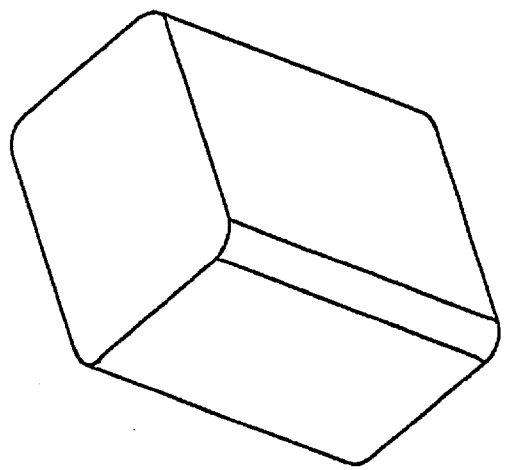

Reference is now made to FIGS. 13A, 13B and 13C, which illustrate three examples of preferred granules of cat litter useful in accordance with a preferred embodiment of the present invention. The cat litter granules are designed to give a cat a sensation of a sand or soil surface, which is preferred by cats during excretion and urination. It is a particular feature of the cat litter that it is not normally crushable by the filtering and crushing sub-system and is sized and configured such as not to pass through the filtering separation and not to become stuck therein, thus clogging the filtering separation. The litter granules 344 are also operative to assist in breaking up the feces 340 and cleaning bowl unit 100 and various portions of the multifunctional assembly 102 as the litter granules circulate therethrough.

Figure 14:
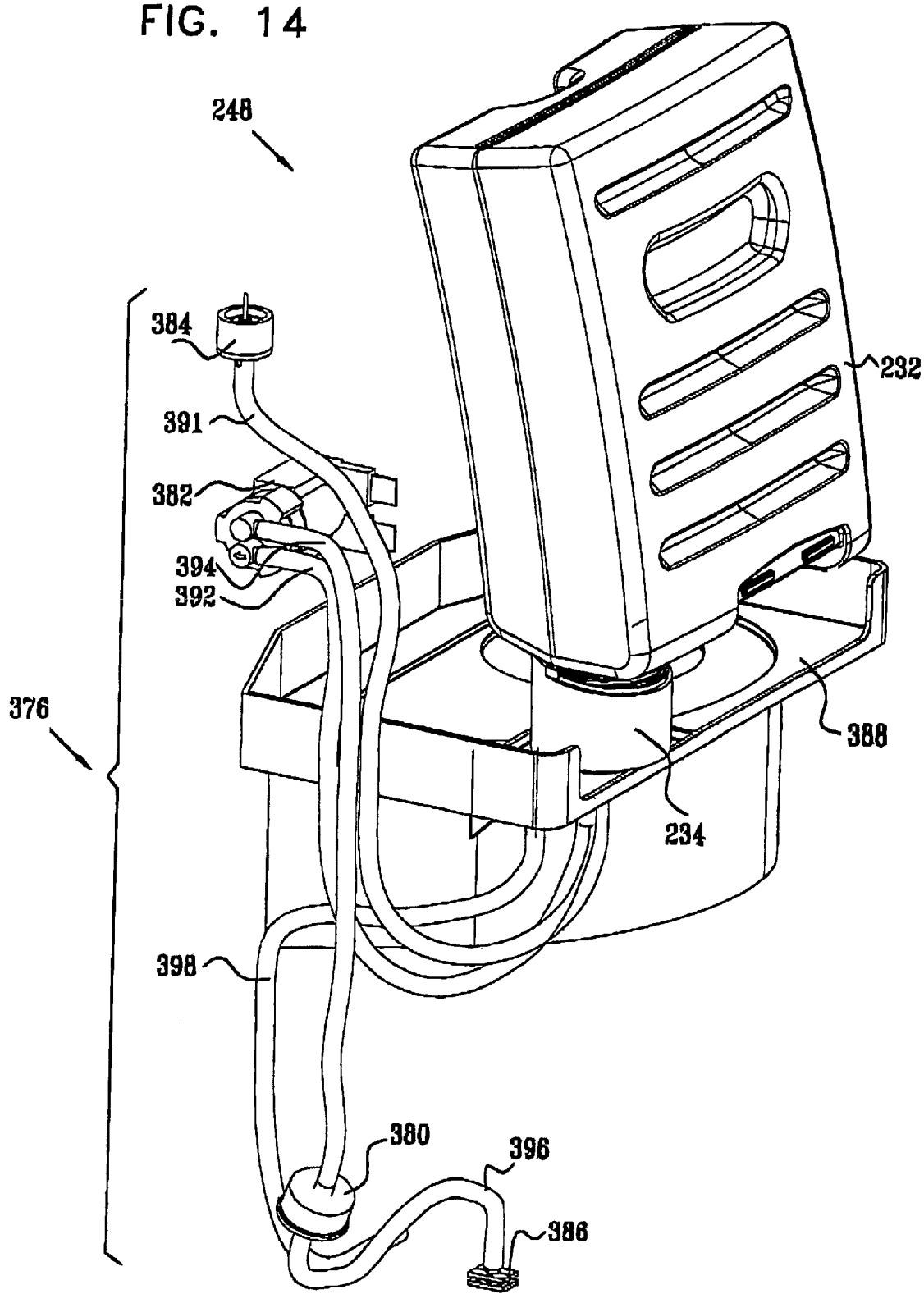
FIG. 14 is a partially cut away simplified pictorial illustration of a solution dosing subsystem forming part of the multifunctional assembly of FIG. 5.

Reference is now made to FIG. 14, which is a partially cut away simplified pictorial illustration of solution dosing subsystem 248 forming part of the multifunctional assembly of FIG. 5. The dosing subsystem 248 preferably comprises the solution container subsystem 232 as well as a pipe and pump subsystem 376, which is located within the multifunctional assembly 102. The solution container sub system 232 is described hereinbelow with reference to FIGS. 15A & 15B.

The pipe and pump subsystem 376 preferably comprises a flow regulator 380, a dosage pump 382, a ventilation valve 384 and a flow director 386. A support 388 supports the interface socket 234 and receives container subsystem 232. The housing also defines a drainage opening 389. An excess flow hose 398 is connected to drainage opening 389 (FIGS. 15A and 15B) for draining any excess cleaning solution 390 which may collect in socket 234.

A ventilation hose 391 connects ventilation valve 284 to socket 234 as described hereinbelow with respect to FIGS. 15A and 15B, and an inlet hose 392 connects dosage pump 382 to socket 234. An outlet hose 394 connects the dosage pump 382 to flow regulator 380 and a further hose 396 is connected between the flow regulator 380 and the flow director 386.

In operation, the cleaning solution 390, a cleaning and/or deodorizing and/or disinfecting and/or water softening liquid or any other suitable fluid is pumped by dosage pump 382 from container subsystem 232 via socket 234 and hose 392 through flow regulator 380, outlet house 394 and flow director to cat toilet bowl unit 100. As the liquid is pumped to bowl unit 100, the ventilation valve 384 opens and allows air to enter the container subsystem 232. Operation of the control subsystem 232 preferably takes place during a stage of the crushing operation described hereinabove with reference to FIG. 11A and enhances cleaning and deodorizing of the litter granules 344.

Figure 15A:
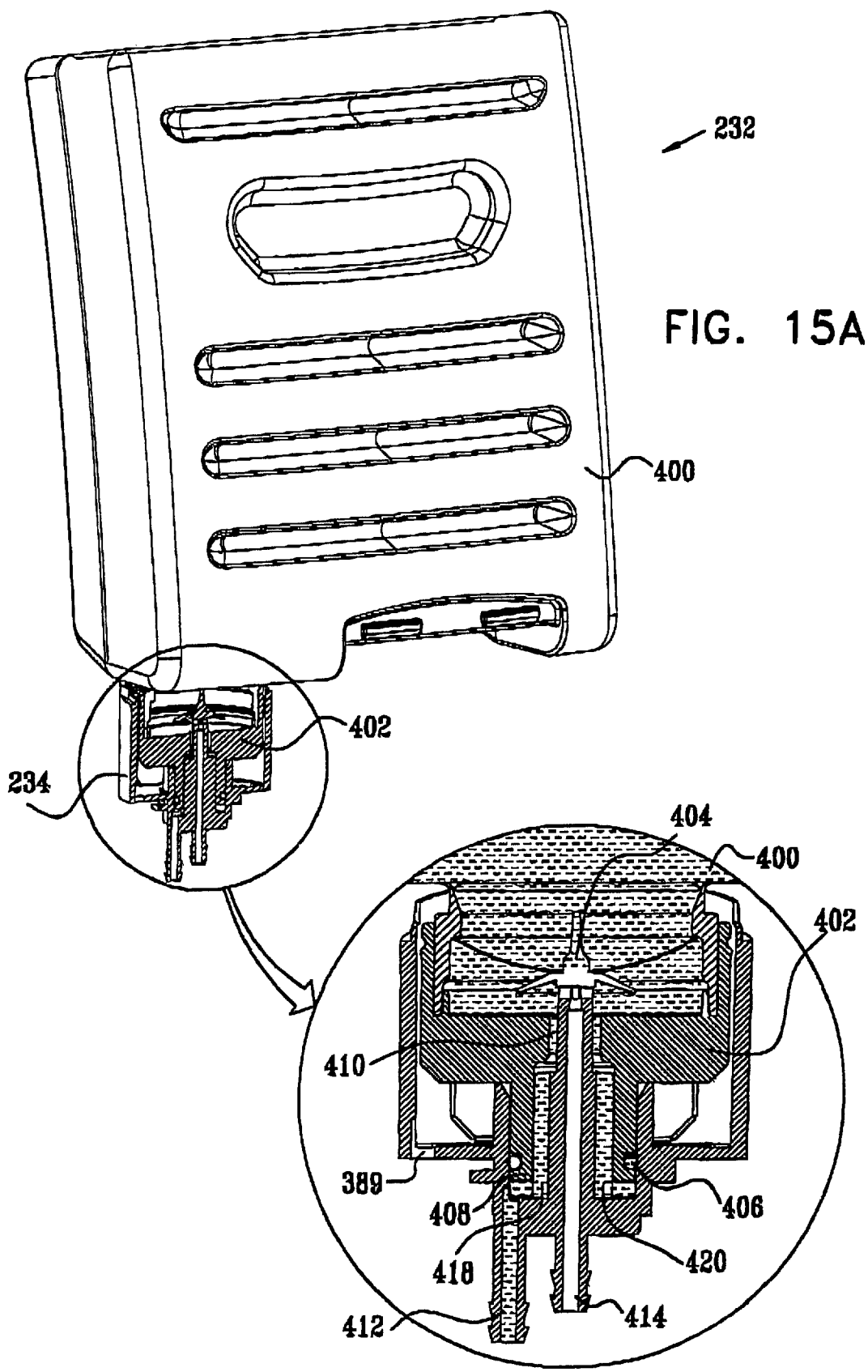
FIGS. 15A and 15B are partially pictorial, partially sectional illustrations of a solution container and a container interface forming part of the subsystem of FIG. 14 is respective flow disabled and flow enabled orientations.
Figure 15B:
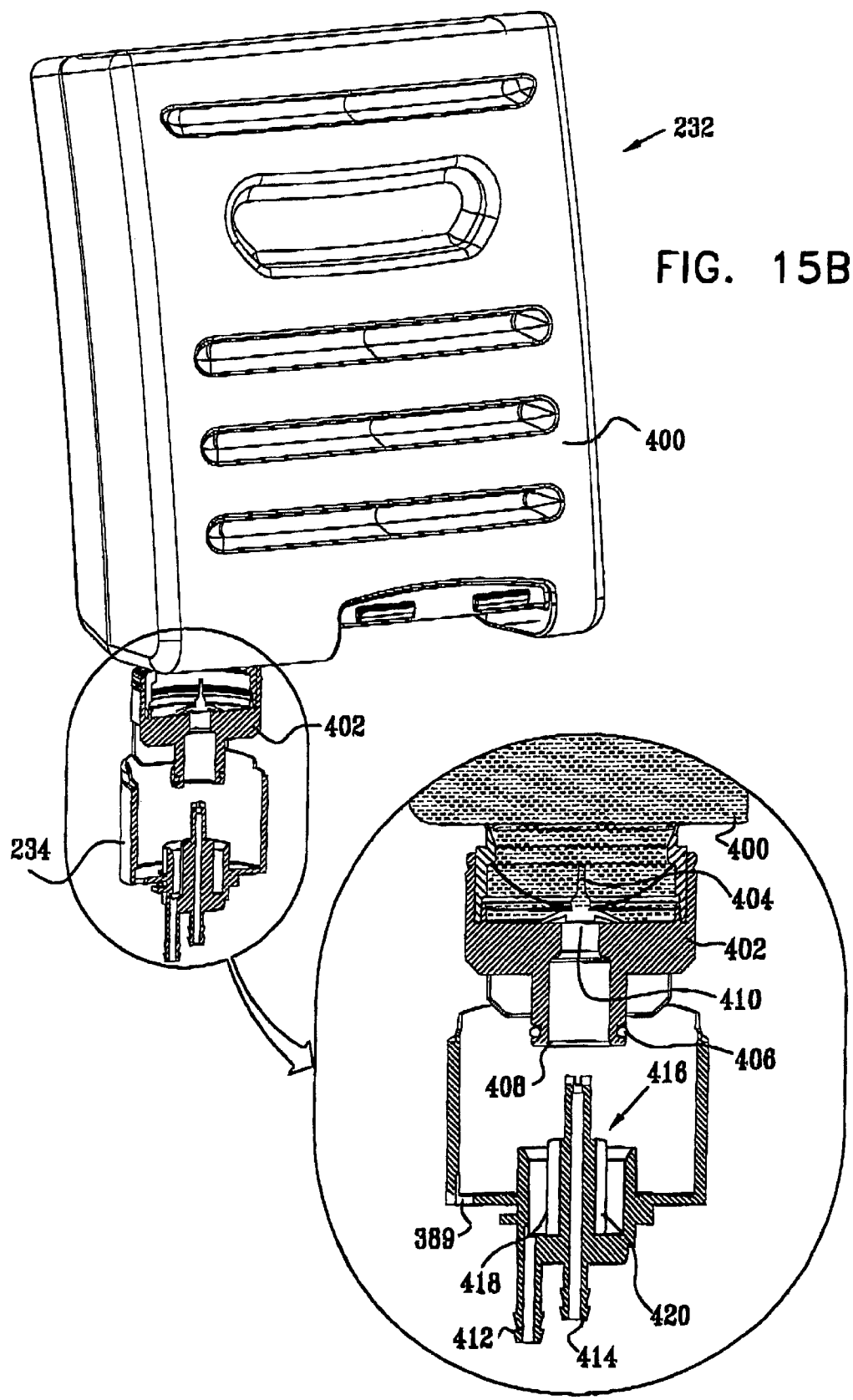

Reference is now made to FIGS. 15A and 15B, which are sectional illustrations of a preferably plastic solution container and a container interface forming part of the subsystem of FIG. 14 in respective flow enabled and flow disabled orientations. The solution container subsystem 232 comprises a solution container 400, which is connected to a container interface 402. The container interface 402 comprises an open/close valve mechanism 404, which enables and disables the solution to flow out of the container 400, through an opening 410 located in the interface 402.

A sealing device, such as an O-ring 406, sits on a support 408 and provides a seal between the subsystem 232 and the pump and pipe subsystem 376 (FIG. 14). Specifically, the sealing device 406 seals between the interface 402 and the socket 234.

The socket interface 234 preferably comprises an exit nipple 412 and a ventilation nipple 414. The exit nipple 412 connects between the hose 392 (FIG. 14) and the interface 234. The ventilation nipple 414 connects between the ventilation hose 391 (FIG. 14) and the interface 234. The interface also includes the drainage opening 389, as described hereinabove with respect to FIG. 14.

A flow channel element 416, is typically divided into 4 flow channels, which surround the ventilation nipple 414. Two of these flow channels 418 and 420 are indicated in FIGS. 15A and 15B. The ventilation nipple 414 allows a cleaning solution 390 to flow from the container subsystem 232 to the pump system 376. Ventilation air is allowed to enter the container subsystem 232 from the pump system 376 via the nipple 414.

It is envisaged that in another embodiment of the present invention, the flow channel element 416 may be replaced by a different flow control mechanism, which may typically include flow channels located in the container subsystem 232. The flow control functionality operates while interfacing the container interface 402, which is located in the container subsystem 232, to the socket interface 234 which is located within the multifunctional assembly 102. This mechanism controls the solution flow using the container subsystem 232.

In operation, the user places the container subsystem 232 into the recess 230, such that the container interface 402 fits into the socket interface 234. Upon fitting the subsystem 232 into the socket 234, the ventilation nipple 414 passes through the opening 410 and abuts against the open/close valve mechanism 404 forcing it to open. On the nipple 410 abutting against the mechanism 404, the cleaning solution 390 flows from the container 400, around the ventilation nipple 414 through the flow channels 416 and exits container subsystem 232 via the exit nipple 412.

Ventilation of the container subsystem 232 is achieved by ventilating air entering the subsystem 232 from the ventilation valve 384 (FIG. 14) via the ventilation nipple 414.

The solution exits the nipple 412 and flows into the pump subsystem 376 as described hereinabove with respect to FIG. 14.

Figure 16:
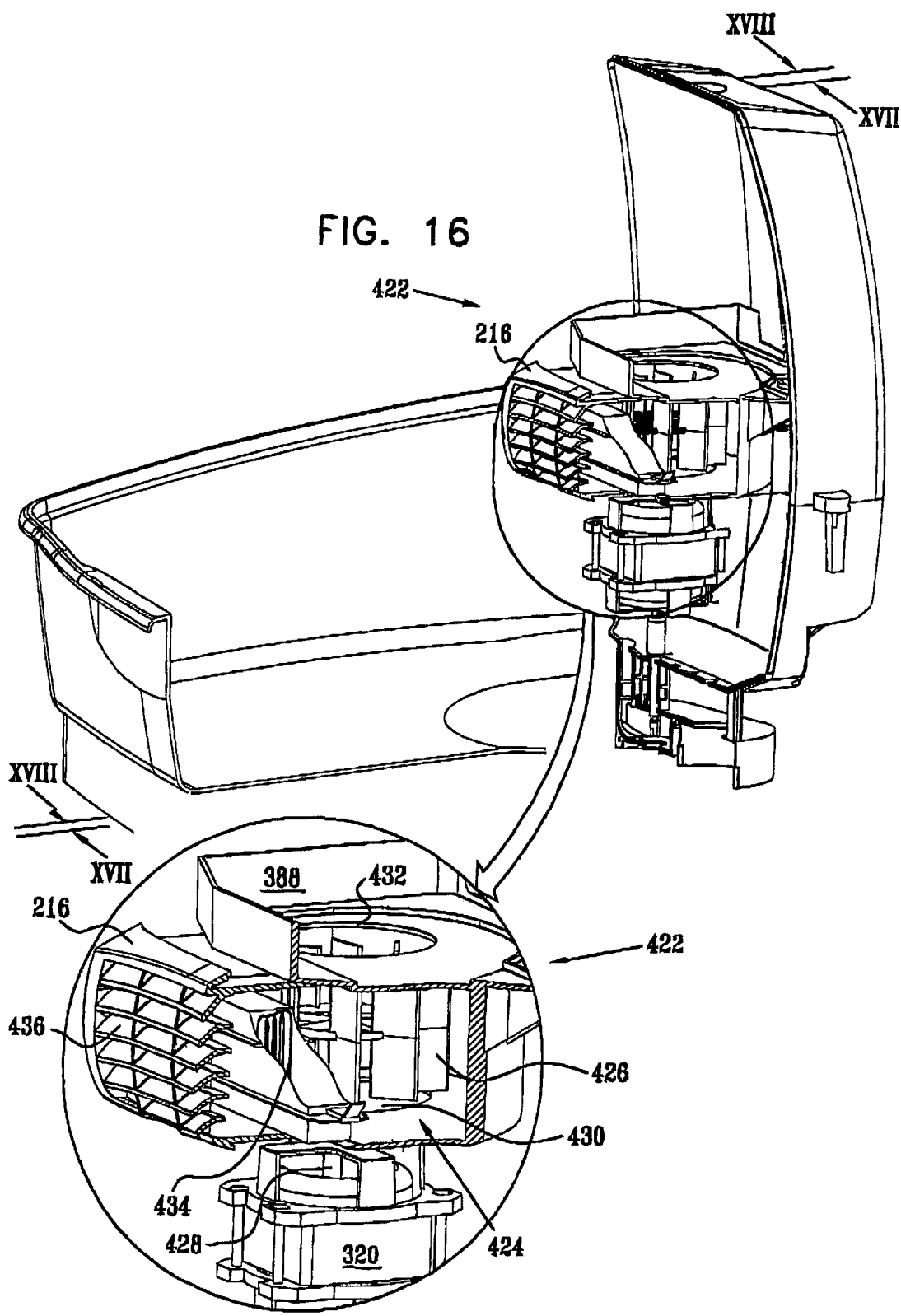
FIG. 16 is a partially cut away simplified pictorial illustration of a granule drying subsystem forming part of the multifunctional assembly of FIG. 5.

Reference is now made to FIG. 16, which illustrates a granule drying subsystem 422 constructed and operative in accordance with a preferred embodiment of the invention. The granule drying subsystem 422 comprises a multiple vane centrifugal impeller 424, which is comprised of multiple vanes 426. The impeller 424 is connected to the drive of the pump motor 320 (FIGS. 8, 9 and 10) via a drive shaft 428. The granule drying subsystem 422 includes a lower air inlet opening 430, which is located at the base of the housing 388. An upper air inlet 432 is located in the top portion of the housing 388. An electrical air heater 434 is located behind the outlet grill 216, as shown in FIG. 16.

The outlet grill 216 comprises slats 436 whose angle of direction may be adjusted to direct the heated air onto the moist granules 344 contained in the bowl unit 100. It is appreciated that the slats 436 may be positioned at such an angle so as to inhibit the flow of air to the outside environment.

Figure 17:
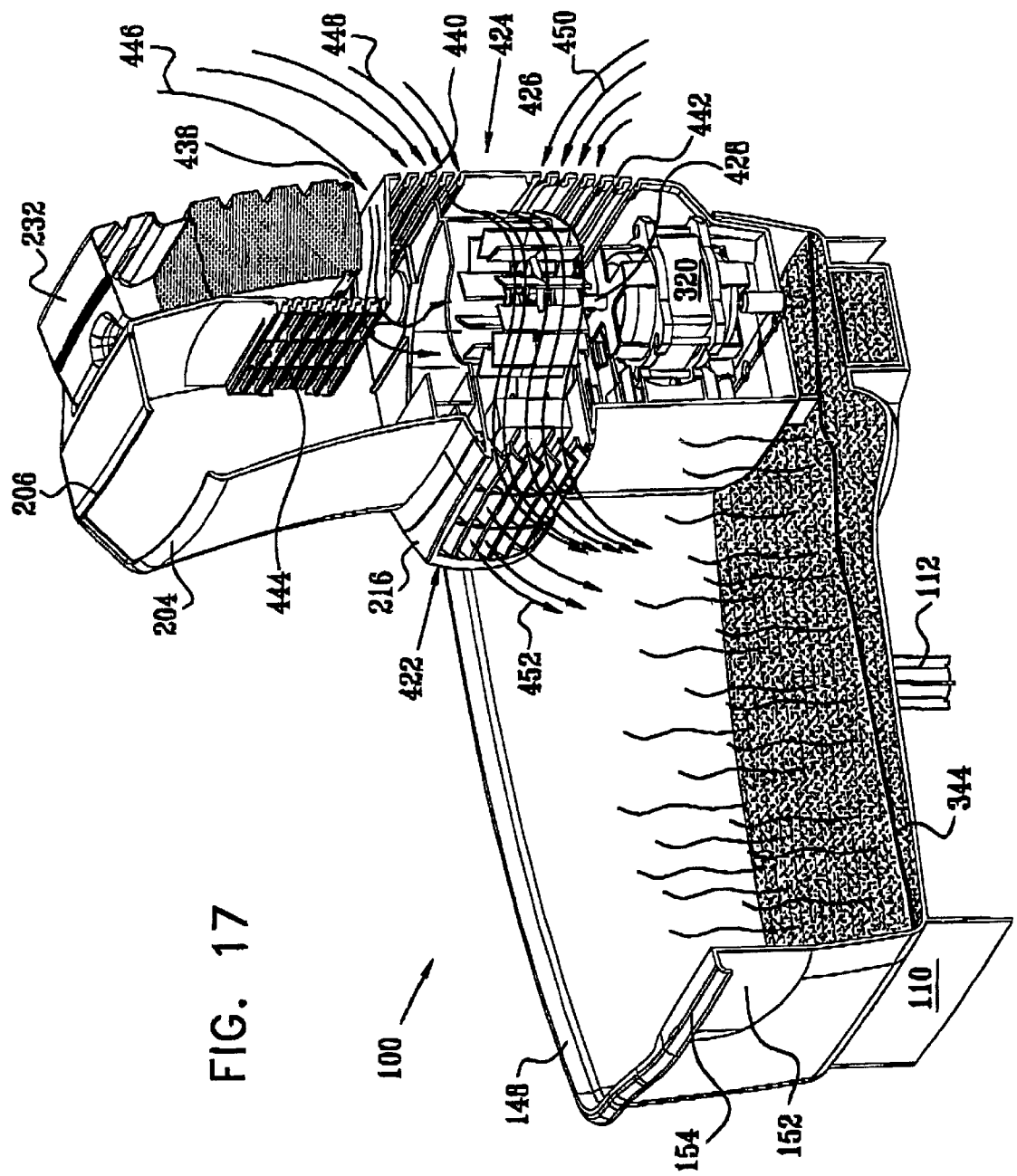
FIG. 17 is a sectional illustration taken along lines XVII—XVII in FIG. 16 showing an air flow during operation of the subsystem of FIG. 16.

The air inlet openings 430 and 432 receive external air via an air opening 438 and outside air inlets 440 and 442, which are located in the multifunctional assembly 102, as shown in FIG. 17. FIG. 17 also shows that the air flow from opening 438 flows under the container subsystem 232 through an air inlet port 444.

Reference is now made to FIG. 17, which is a sectional illustration taken along lines XVII—XVII in FIG. 16 showing an air flow during operation of the subsystem of FIG. 16.

An air stream 446 flows through the opening 438 and air inlet port 444, and reaches the heater 434 via the upper inlet 432. An inlet air flow 448 also reaches the heater 434 from the upper opening 438. An air inlet flow 450 flows through the air inlet 432 and reaches the heater 434 via the lower air inlet 430.

The air flows 446, 448 and 450, are drawn into the drying subsystem 422, by the rotating vanes 426. The inlet air flows through the heater 434, wherein the air is heated to a predetermined temperature and exits the drying subsystem 422 through the outlet grill 216.

The exit air flow 452 is directed by the slats 436 onto the moist granules 344 contained in the bowl unit 100.

It is also appreciated that the air flows 446, 448 and 450 also provide air cooling for the internal components of the multifunctional assembly 102, by virtue of appropriate location of the air inlets 440, 442 and 444.

Figure 18:
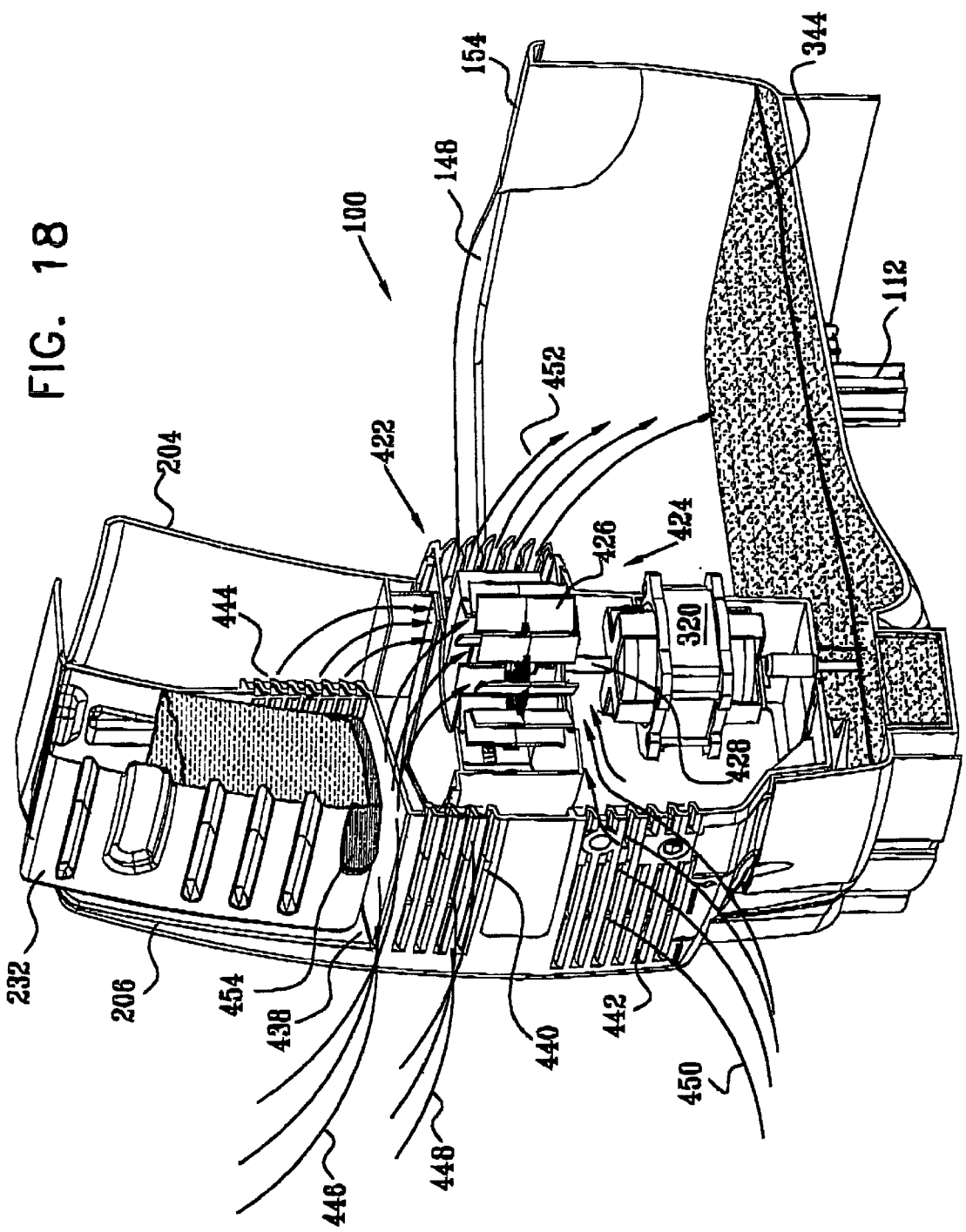
FIG. 18 is a sectional illustration taken along lines XVIII—XVIII in FIG. 16 showing an air flow during operation of an alternative embodiment of the subsystem of FIG. 16.

FIG. 18 is a sectional illustrations taken along lines XVIII—XVIII in FIG. 16 showing an air flow during operation of an alternative embodiment of the subsystem of FIG. 16. FIG. 18 shows an air purifying device 454, such as an air deodorizer or air filter, preferably located under the container subsystem 232. The air purifying device 454 is located such that the air stream from the upper air opening 438 flows over the air purifying device 454, as shown in FIG. 18.

The air flow 446, which is drawn through the opening 438, as described hereinabove with respect to FIG. 17, flows through the air purifying device 454, providing a deodorized air flow into the assembly 102. The deodorized air flow 452 exits the assembly 102 via the outlet grill 216 and presents fresh smelling and deodorized air.

It is appreciated that an additional air flow driving device (not shown) may also be located in the assembly 102 to provide a deodorized air flow 452. This air driving device may operate independently of the air flow devices described hereinabove with respect to FIG. 16.

Figure 19:
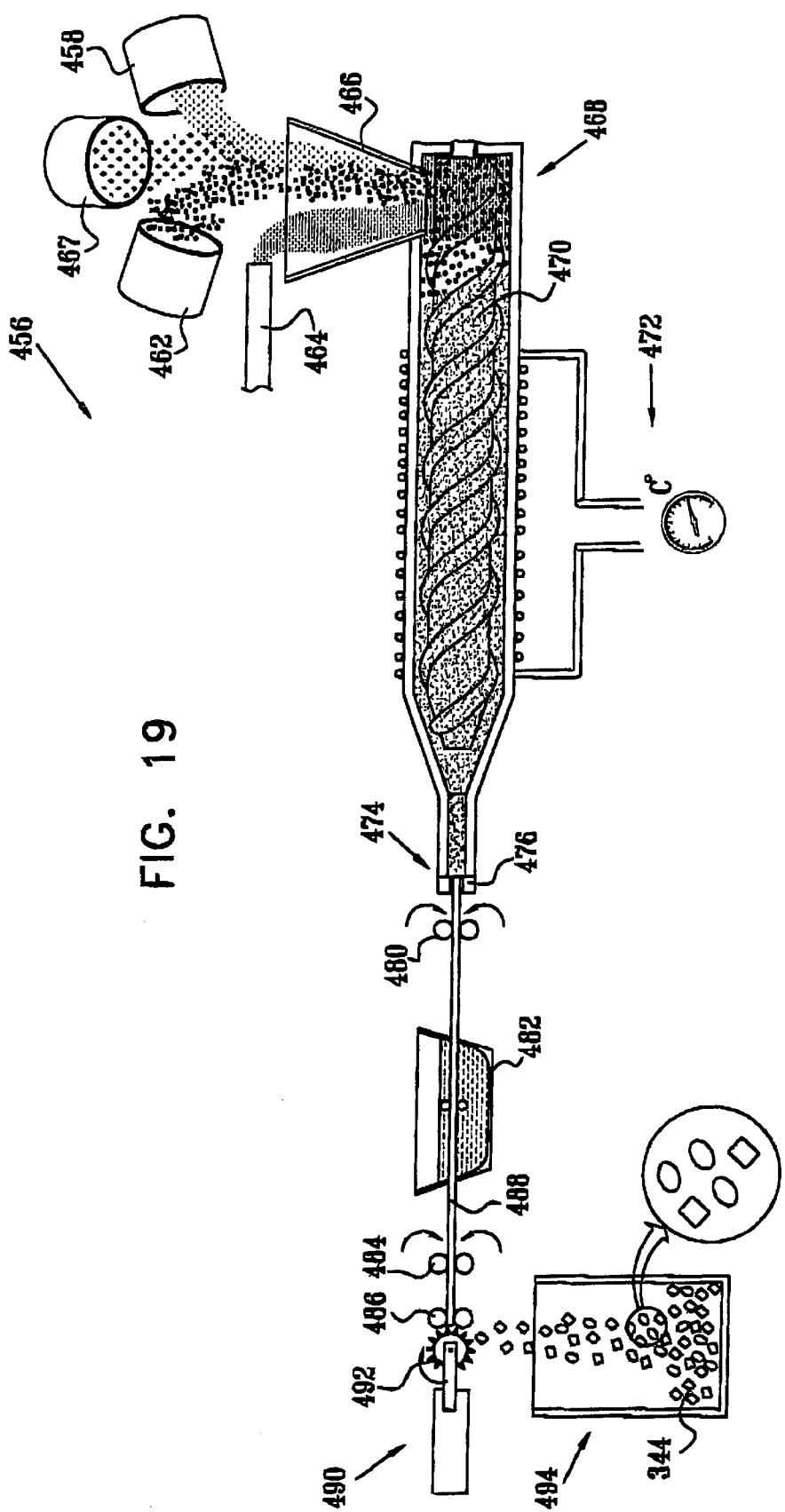
FIG. 19 is a simplified illustration of an apparatus and method of manufacture of granules, in accordance with a preferred embodiment of the present invention.

Reference is now made to FIG. 19, which is a simplified illustration of an apparatus 456 and method of manufacture of granules 344, in accordance with a preferred embodiment of the present invention. The apparatus preferably comprises three containers 458, 460 and 462, shown in FIG. 19 and designated generally by reference numeral 456, which include a plastic material, such as polypropylene, an elastomer, such as block copolymer styrene butadiene styrene and clay, respectively. Preferably, a deodorizing material is also provided from a container 464. The apparatus 456 also includes a hopper device 466 for collecting materials supplied from the containers 458, 460, 462 and 464, as shown in FIG. 19. A typical composition of the mixture of materials is approximately polypropylene 48%–50%, elastomer 30% and clay material 20%. The deodorizing material is typically 2% of the mixture, if added.

The hopper 466 directs the materials into an extruder device 468, which includes a screw device 470 and a heating device 472. The screw device 470 drives the materials from the hopper 466 and the extruder die 474, after being heated by the heater 472 to the melting point of the materials.

The extrude die 474 comprises a nozzle element 476, whose cross-sectional shape determines the shape of the extruded mixture 478. A first set of rollers 480 is located at the exit of the nozzle 478, which direct the mixture 478 to a cooling device 482. The cooling device 482 comprises a cooling fluid, such as water, and cools the mixture to the solid temperature of the mixture 478.

Typically a second and third set of rollers, 484 and 486, respectively, are located at the exit of the cooling device 482 to guide the solid mixture 488 to a cutting device 490. The cutting device 490 typically comprises a rotating cutting blade 492. The cutting blade 492 is shaped for cutting the mixture into the granules 344 of the required shape (FIGS. 13A, 13B and 13C), which are ejected into a granule-collecting container 494.

It is appreciated that the components of the granules 344 and their quantities are chosen such that the granules 344 have properties which give a cat the natural feeling for excreting and/or urinating thereon, similar to the feeling for the cat to excrete and/or urinate on a sand or soil surface. These properties typically include the friction between the granules, the density of the granules and the size of the granules.

Figure 20:
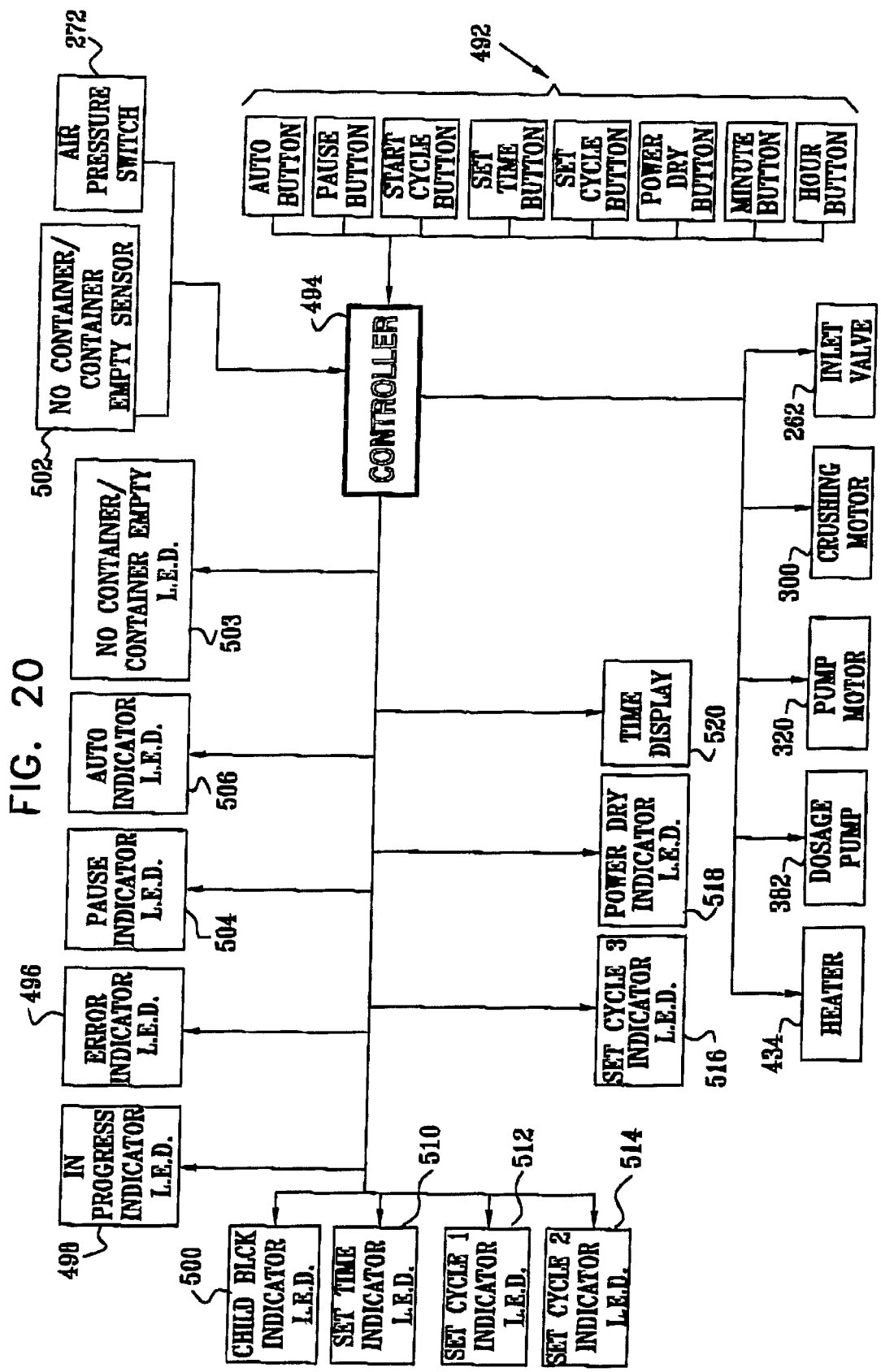
FIG. 20 is a simplified block diagram of the system of FIGS. 1–19.
Figure 21A:
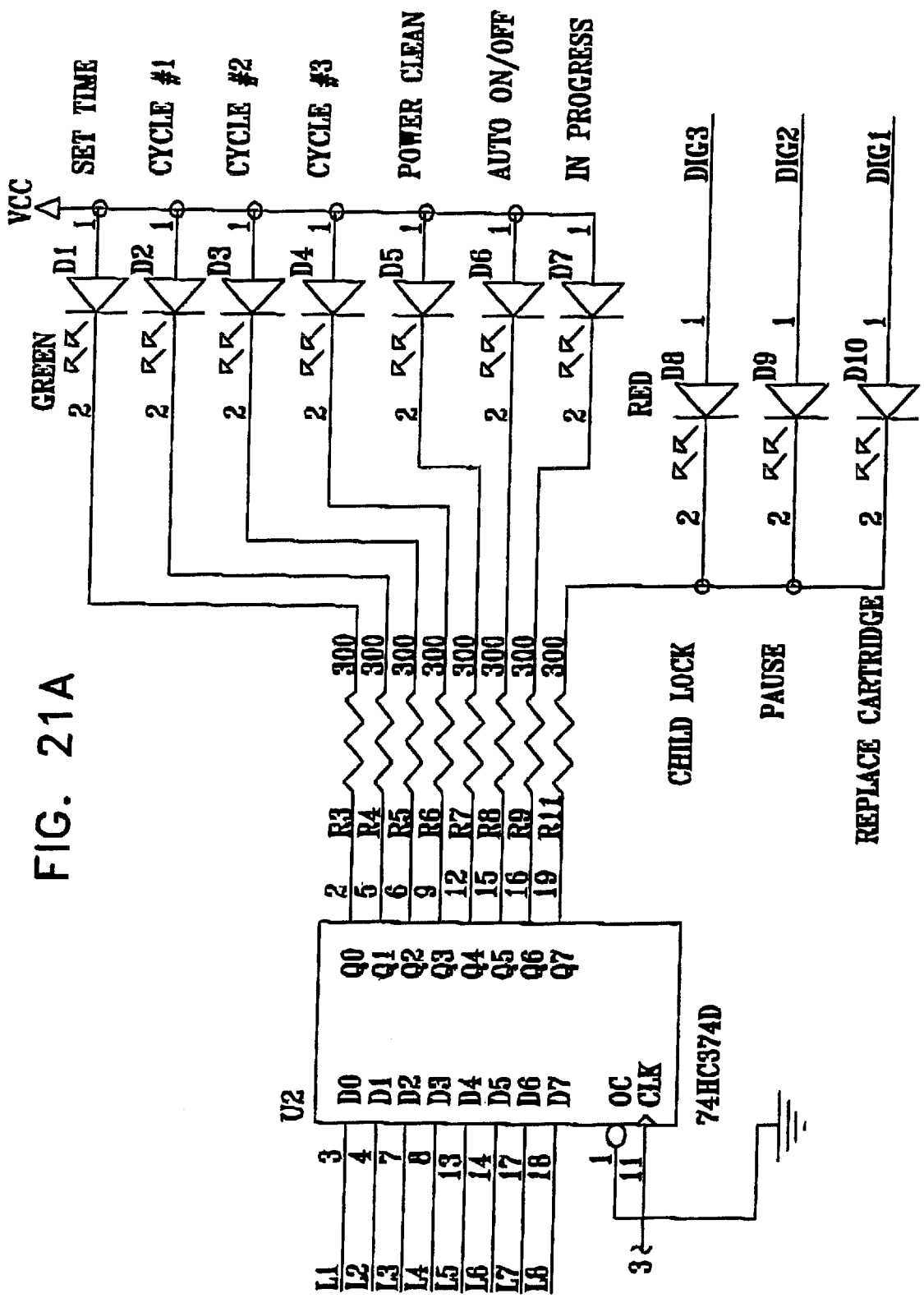
FIGS. 21A–21I are together a simplified electrical schematic illustration corresponding to FIG. 20.
Figure 21B:
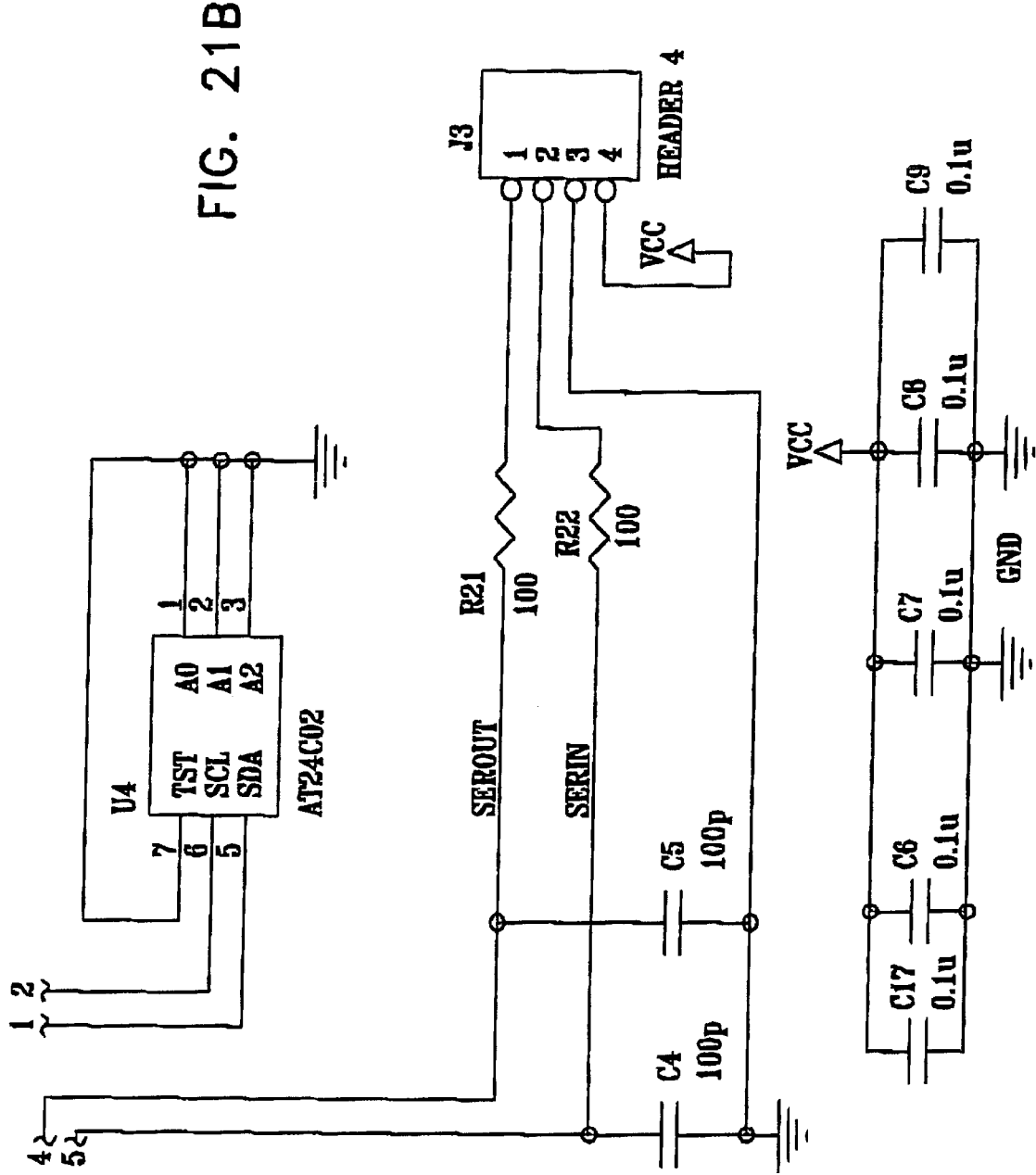
Figure 21C:
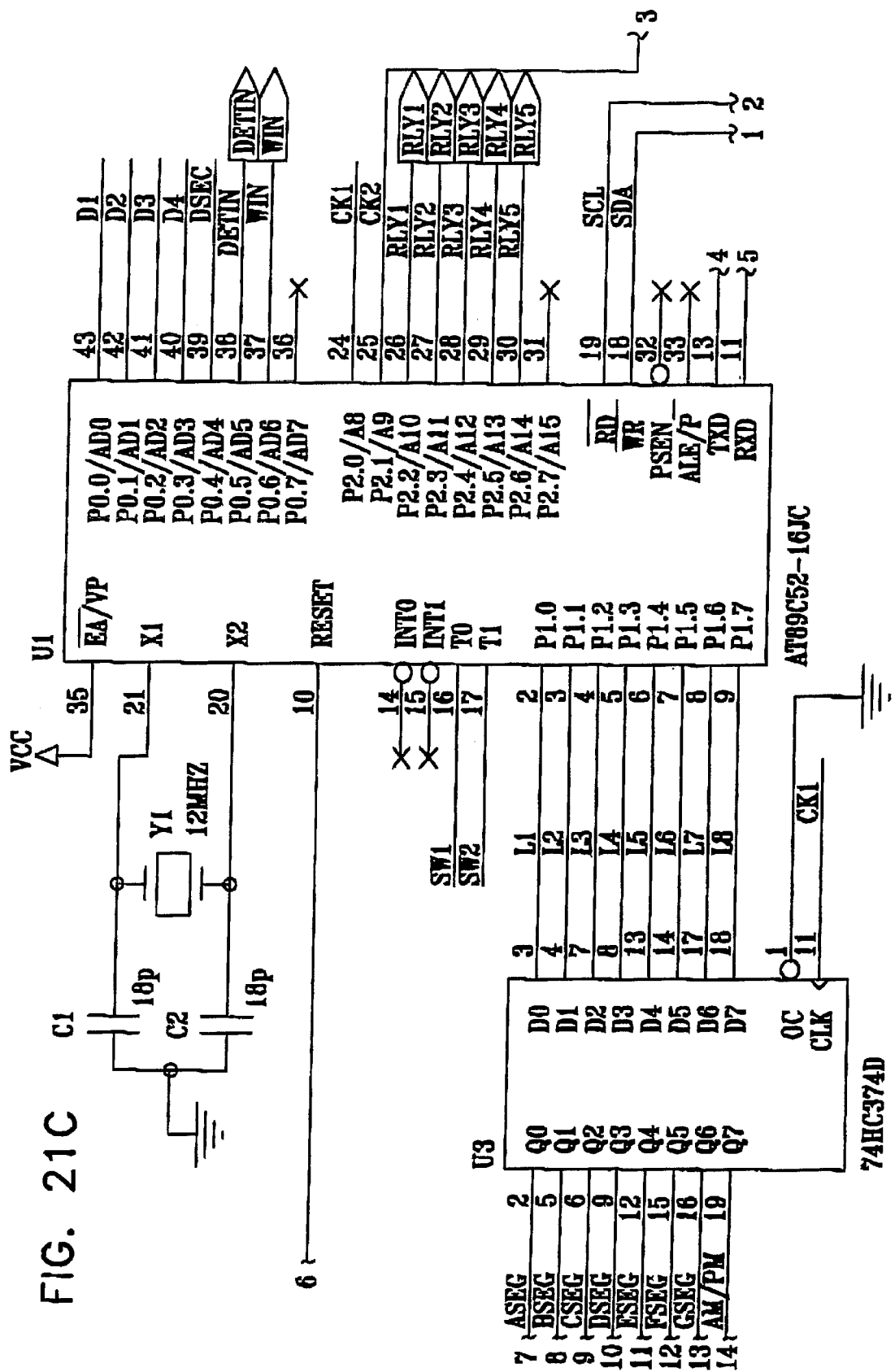
Figure 21D:
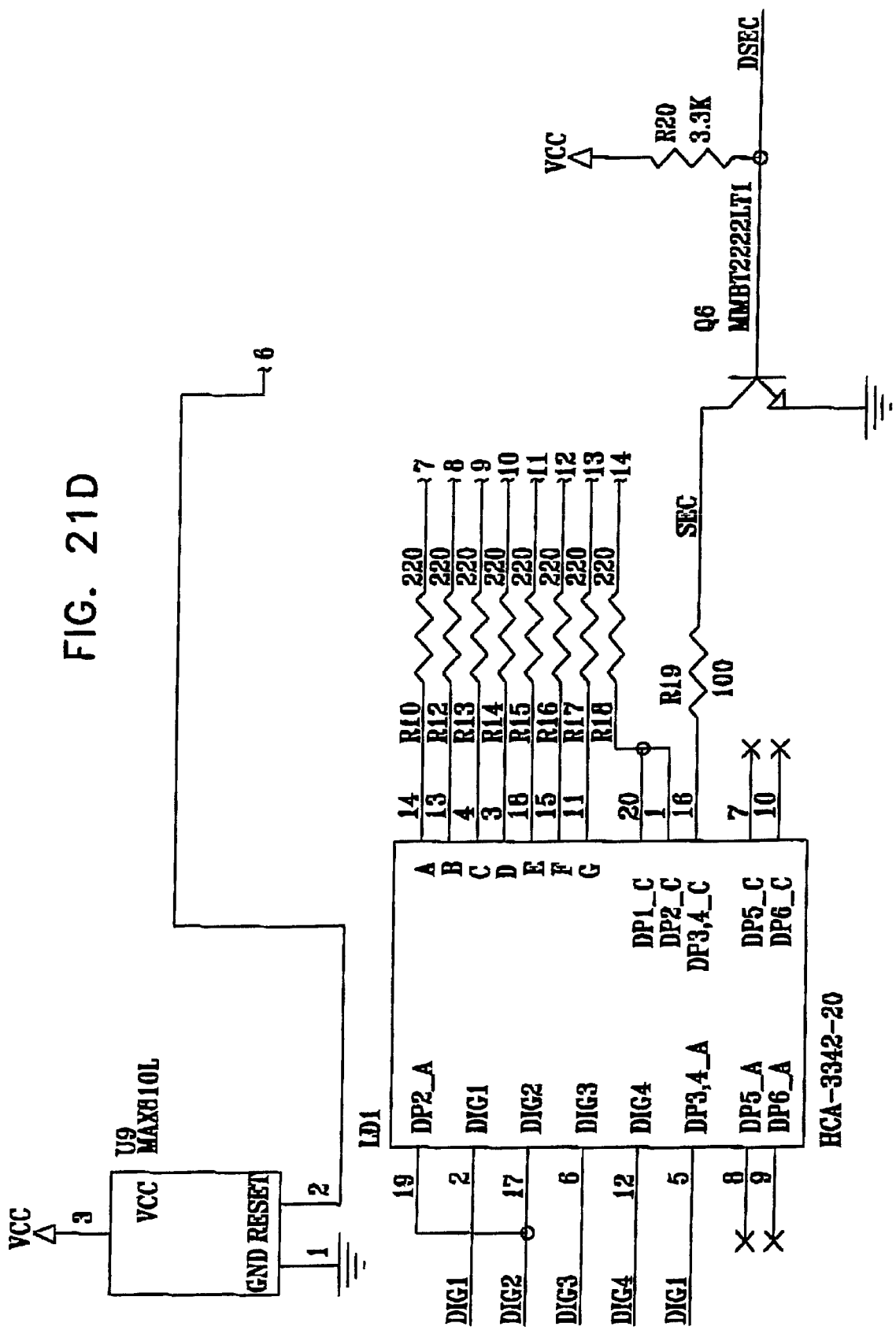
Figure 21E:
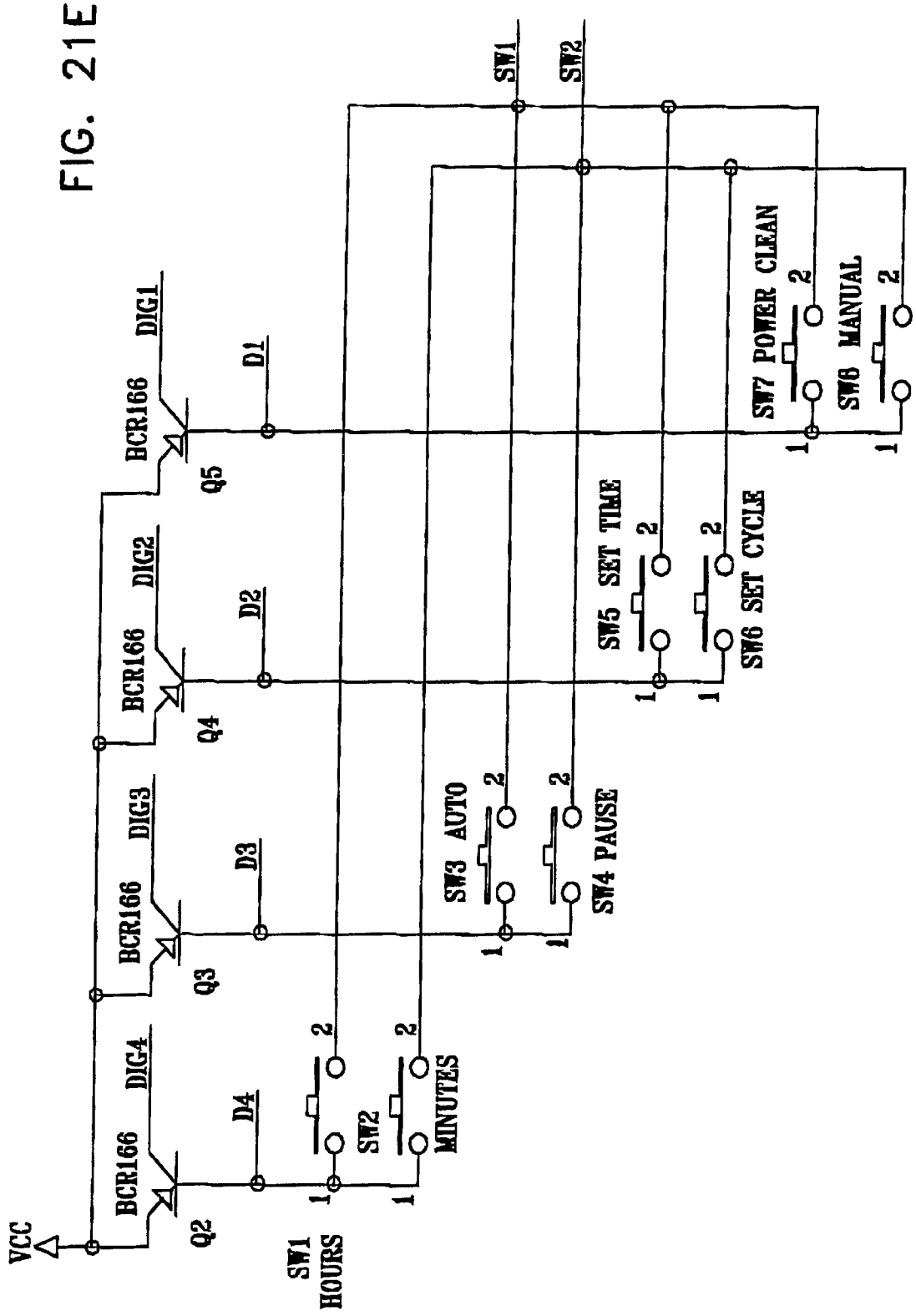
Figure 21F:
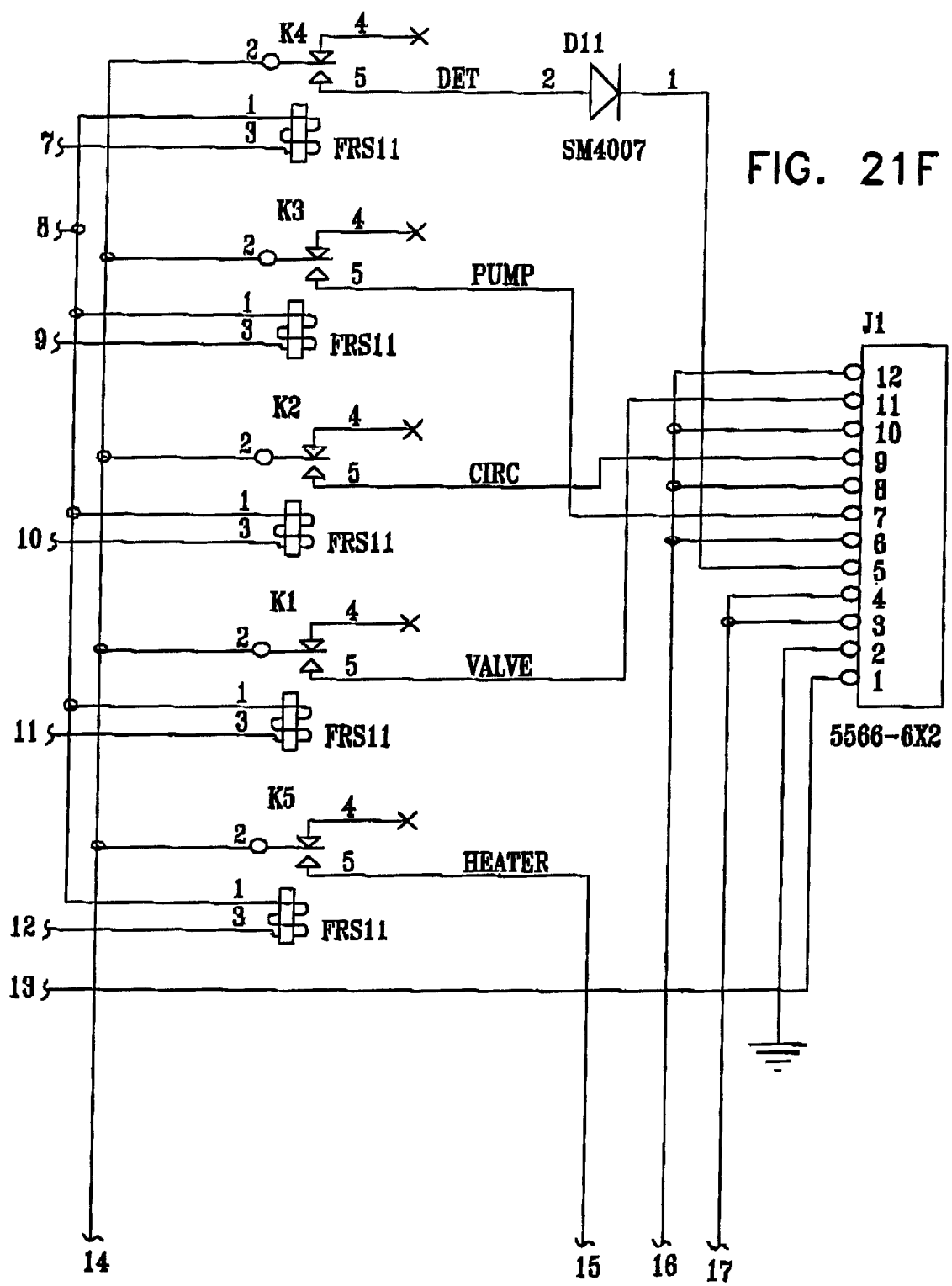
Figure 21G:
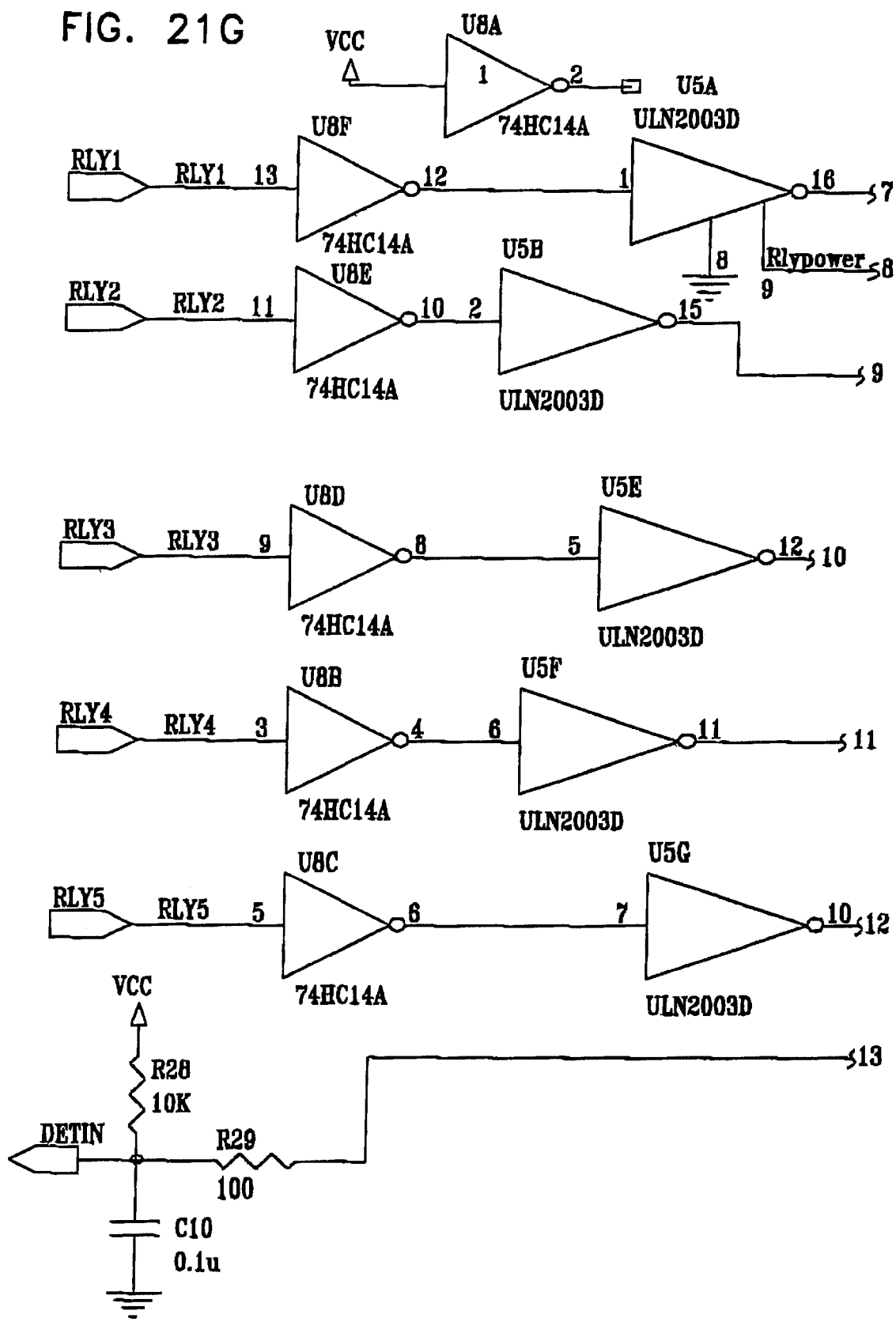
Figure 21H:
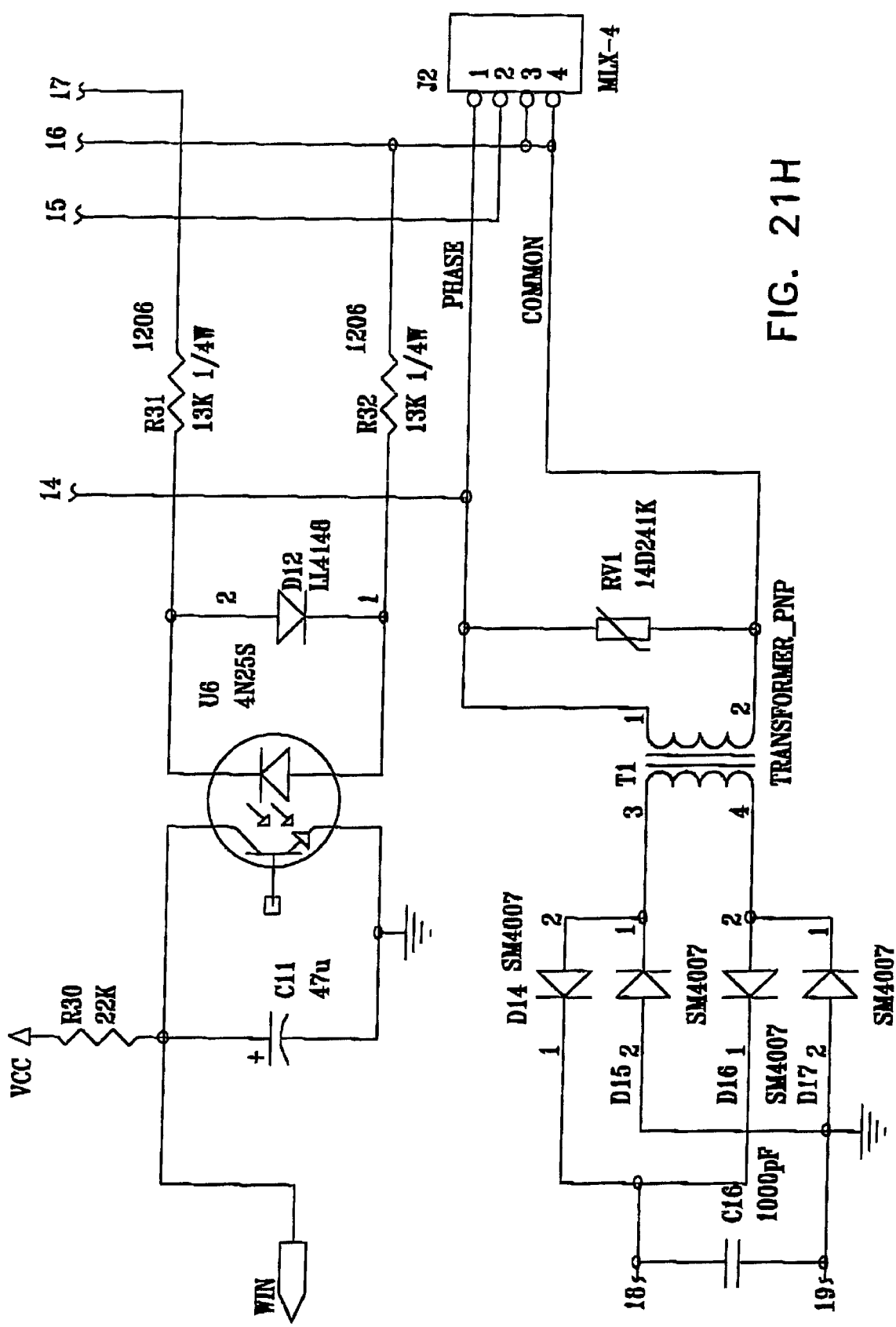
Figure 21L:
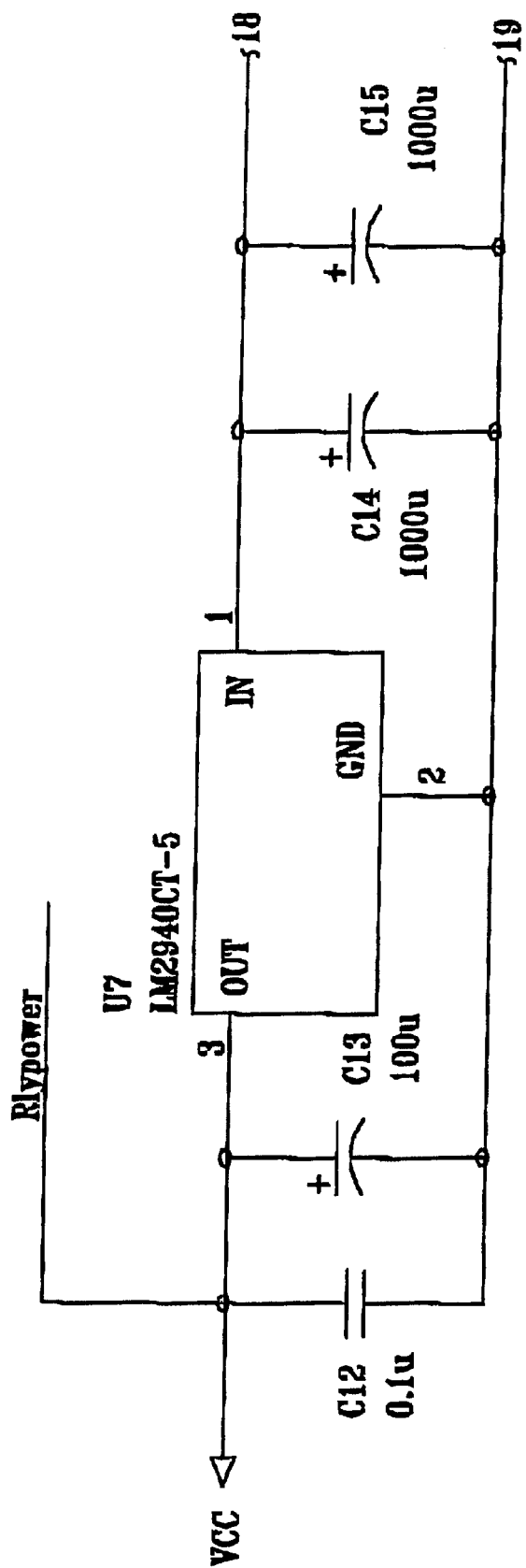

Reference is now made to FIG. 20, which is a simplified block diagram of the system of FIGS. 1–19. As seen in FIG. 20, a controller 500, such as a suitably programmed microprocessor controller, receives inputs from various functional switches 492 forming part of the user interface panel 220 (FIG. 5). Controller 494 preferably also receives input from air pressure operated switch 274 (FIGS. 6, 7A and 7B) and from detector sensor (not shown). Based on these inputs, the controller 500 provides control inputs to the heater 434 (FIG. 16), the dosage pump 382 (FIG. 14), the pump motor 320 (FIGS. 8 and 9), the crushing motor 300 (FIGS. 8 and 9) and the inlet valve 262.

Additionally, the controller 494 provides the following process indications: "ERROR INDICATOR LED 496", "IN PROGRESS INDICATOR LED 498 and CHILD LOCK INDICATOR LED 500, as shown in FIG. 5. The multifunctional assembly also includes the following indicators, which are not shown in FIG. 5: "PAUSE INDICATOR LED 504", "AUTO INDICATOR LED 506", "SET TIME INDICATOR LED 508", "SET CYCLE 1 INDICATOR LED 510", "SET CYCLE 2 INDICATOR LED 512", "SET CYCLE 3 INDICATOR LED 514", "POWER DRY INDICATOR LED 516" and "TIME DISPLAY 518".

The "CHILD LOCK INDICATOR LED 500" indicates that a safety function is in operation, preventing child operation of the system.

The "NO CONTAINER/CONTAINER EMPTY SENSOR 502" detects if the container 400 is empty of cleaning solution 390 or there is no container 400 in the subsystem 232. This operation is indicated by indicated by the "NO CONTAINER/CONTAINER EMPTY SENSOR LED 503". Additionally, it is appreciated that if there is neither cleaning solution 390 nor the container 400, the cleaning cycle is not initiated.

The "PAUSE INDICATOR LED 504" indicates that the current operation of the system has been stopped by pressing the "PAUSE BUTTON" 492.

The "AUTO INDICATOR LED 506" indicates that the system is in automatic operation, according to present timings. This operation is set by pressing the "AUTO BUTTON" 492.

The "SET TIME INDICATOR LED 510" indicates that the time of operation of the system is being set.

The "SET CYCLE 1 INDICATOR LED 512" indicates that a first cycle is being set by pressing the "SET CYCLE BUTTON" 492, once.

The "SET CYCLE 2 INDICATOR LED 514" indicates that a second cycle is being set by pressing the "SET CYCLE BUTTON" 492, a second time.

The "SET CYCLE 3 INDICATOR LED 516" indicates that a third cycle is being set by pressing the "SET CYCLE BUTTON" 492, a third time.

The "POWER DRY INDICATOR LED 518" indicates that the "POWER DRY BUTTON 492" has been pressed to allow for a longer drying cycle (FIGS. 17 and 18).

The "TIME DISPLAY 520" indicates the time of day.

FIGS. 21A–21E are together a self-explanatory electrical schematic illustrations of a preferred embodiment of an electrical controller corresponding to controller 494 of FIG. 20.

Figure 22A:
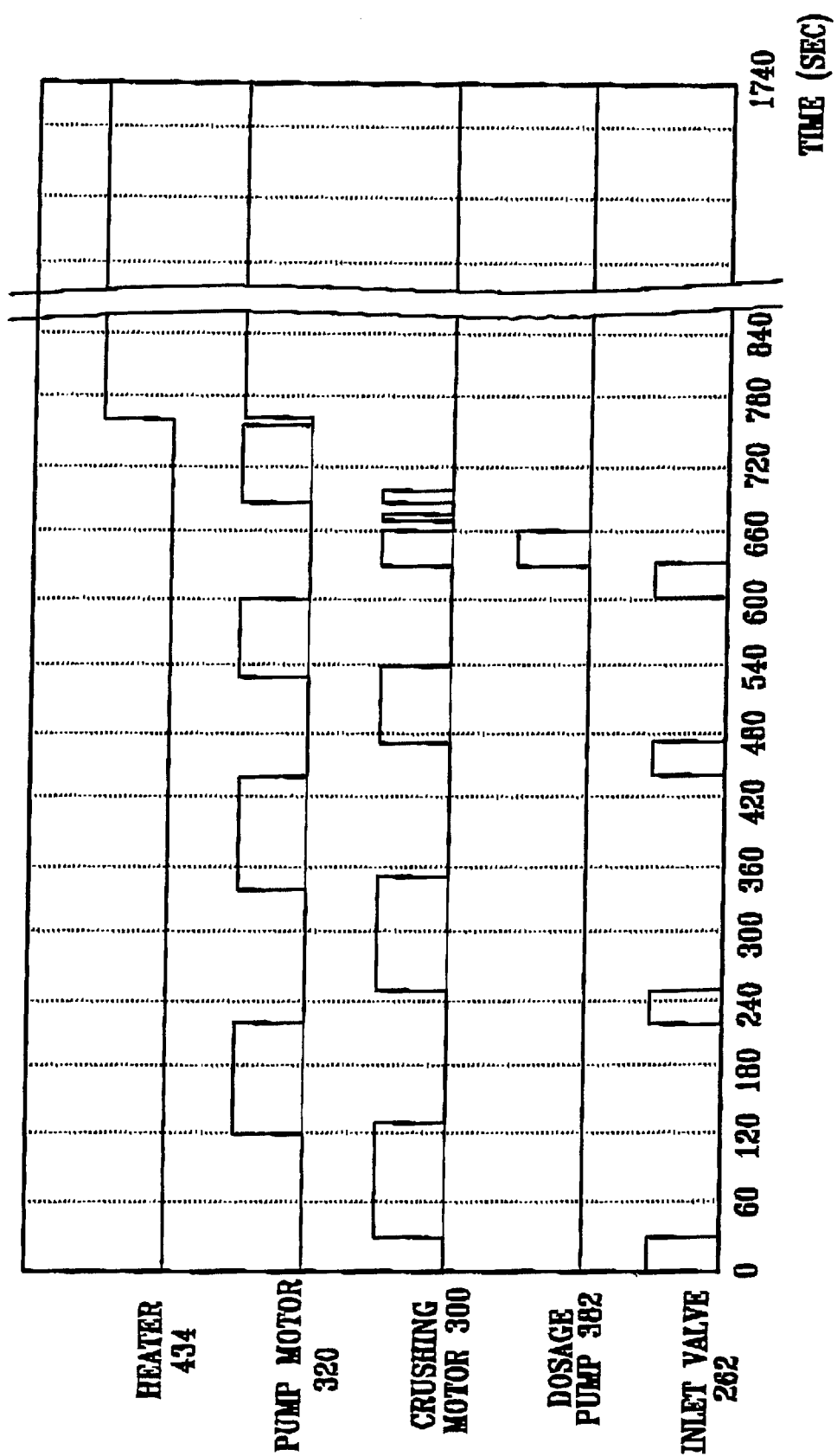
FIG. 22A is a timing diagram useful in understanding the operation of the system of FIGS. 1–21.
Figure 22B:
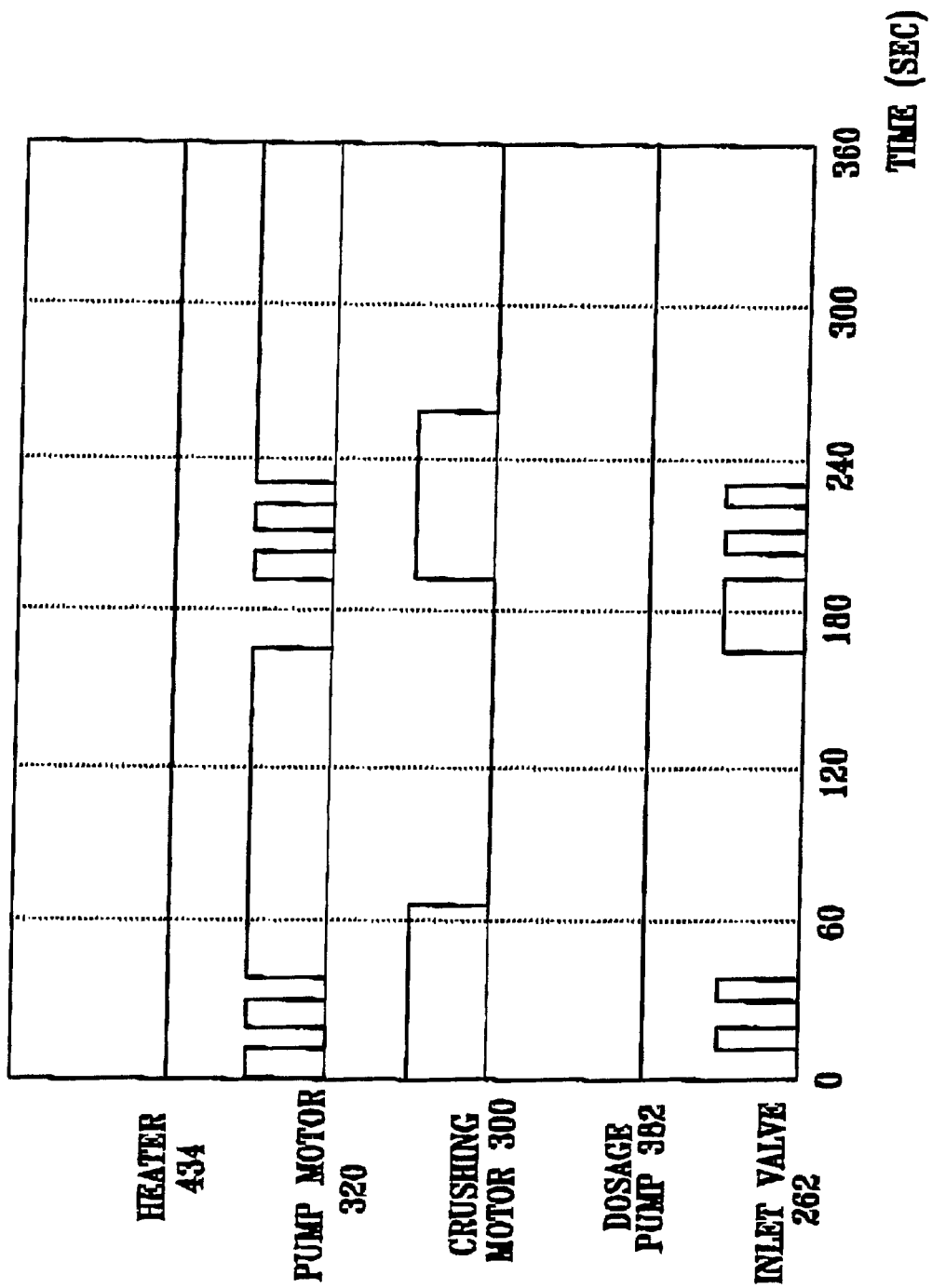
FIG. 22B shows the timing sequence for the "abnormal operation" of the components of the multifunctional assembly 102.

Reference is now made to FIG. 22A, which is a timing diagram useful in understanding the "normal operation" of the system of FIGS. 1–21E and to FIG. 22B, which shows a timing sequence of an "abnormal operation" of the components of the multifunctional assembly 102. FIG. 22A sets forth in a self-explanatory manner, the time relationship between operations of various elements in the system, for normal operating conditions. The controller 494 operates the components of the multifunctional assembly 102, as shown in FIG. 20.

At every water filling operation of the bowl unit 100, the controller 494 measures the water filling time. If the period of filling time is too short, the controller 494 decides that the previous drainage operation was not completed indicating that the filtering separation 360 is blocked with feces residue. The controller 494 then operates an "abnormal operation" sequence shown in FIG. 22B. The controller 494 operates the sequence in FIG. 22B for at least 2 cycles. During the abnormal operation, the controller 494 checks the filling time. If the last filling time is not sufficiently long, the controller 494 operates the pump motor for several minutes and attempts to empty the water remaining in the bowl unit 100 and then indicates an error message.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

APPENDIX A

```
:10132E00010204081020408000000000000000000B0
:10133E00C0F9A4B0999282F88090C9FF12001100F2
:10134E00300030001A000000000001350000110A1
:10135E004618060846000180000011046180608CF
:10136E004600018000001102F1806082F00018092
:10137E00000000114130008100200081806082F00C0
:10138E000448EA48EA48EA0000000001180C300858
:10139E00180C3008180C0846000180000001180CCB
:1013AE003008180C3008180C0846000180000001A7
:1013BE00180C3008180C3008180C08460001800074
:1013CE000001180C3008180C3008180C08460001E3
:1013DE00800000011413000810020008180808 2FDE
:1013EE000000448EA48EA48EA0000000000000055
:1013FE000000000000000000000000000000000DF
:10140E0000000000000000000000000000000000CE
:10141E0000000000000000000000000000000000BE
:10142E0000000000000000000000000000000000AE
:0A143E00000000000000000000FFA5
:1012B6000128FC0123FF0126000122000125 0016F
:1012C60021FF01240001200001270FC15EC14DC18D
:1012D60054C157C158C1C8C156C155C160C1DBC14F
:1012E6005AC159C15FC152C149C14AC153013700F0
:1012F6000162000136FF014B000139000452FF92E2
:10130600868 7042D80800000013A00014700014FC6
:1013160000023100000 13E00013D00014800013C91
:0713260000013B000146003D
:10002E008B6A8A6B896C20581F20521C20491975C7
```

APPENDIX A
*-continued*

```
:10003E0055877554867553927552FFC284C257C246
:10004E005E12080A75270F22AB6AAA6BA96C1214EE
:10005E00D4D39402401375558E75548E7553C07556
:10006E0052FFC284C257C25E22E4FFAB6AAA6BA9DA
:10007E006C8F827583001214ED90133E93FE7452B2
:10008E002FF8C6EEC60FBF04E2AB6AAA6BA96C903E
:10009E0000001121 4EDFE1214D4FDC454F04EFFD321
:1000AE009412402FEFC394255029EEC39402500CA6
:1000BE00EE90134693F5537552FF8017AB6AAA6BF9
:1000CE00A96C9000011214ED90133C93F553EDA31F
:1000DE0093F55290133EE493655270037552FFEF01
:1000EE00D39411400AEFC394245004C24B8002D221
:1000FE004BD25ED284204903305203C25722D257CC
:10010E00204A057527F08003E4F527D25C12080A11
:01011E0022BE
:10011F008B678A688969C262900003740112153C6B
:10012F00B40A27AB67AA68A969900003E412158186
:10013F00900002740112153CB4060FAB67AA68A9B0
:10014F0069900002E4121581D262206109AB67AA9F
:10015F0068A96912002EAB67AA68A96990000312FB
:10016F0014EDD3940940047F0180027F00900002B8
:10017F001214EDD3940540047E0180027E00EE4FF1
:08018F00600312057DA262224B
:100197008B678A688969C262304935E54BD3940217
:1001A700402E1214D4FFB402129000011214EDB4C1
:1001B7000309740312156FD2628015EFD3940240BE
:1001C7000F9000017404121581740212156FD26228
:1001D700206266AB67AA68A96990000174011215CD
:1001E7003CB40A0E900001E4121581740112151A2D
:1001F700801B900001121 4EDB405121214D4B4023E
:100207000C9000017401121581E412156FAB67AAF7
:1002170068A969900001121 4EDD3940940047F0185
:1002270080027F001214D4D3940240047E0180021E
:10023700E00EE4F600312057D206109AB67AA6857
:06024700A96912002E223D
:03002B0002024D81
:10024D00C0E0C083C082C0D075D008A2B2B392B254
:10025D00C2CF053AE53A5403FF43800F14604214B0
:10026D00607114700302030224036003020318304B
:10027D004B0B305E08901335E493F45252E5524522
:10028D002DF590D2A0A25B921FA259922FE5234586
:10029D0025F590D2A1C280A2B49208A2B592098090
:1002AD006A204B0B305E08901335E493F45253E5FE
:1002BD0053452EF590D2A0A248921FA255922FE53C
:1002CD00234525F590D2A1C281A2B4920AAB5927E
:1002DD000B8038E554452FF590D2A0A25D921FC238
:1002ED002FE5234525F590D2A1C282A2B4920CA28E
:1002FD00B5920D8016E5554530F590D2A0C283A27A
:10030D00B4920EA2B5920FD24D1535E53A646460E4
:10031D00030203AD0547E545154570021544E4F5A7
:10032D003A303803632DFF303903632EFF303A0323
:10033D00632F7F303B0363307F30570C304A09A267
:10034D005CB3925CA25C9284E5266225305A07A2CA
:10035D0059B392598002C259205607A255B39255EE
:10036D008002C255E54720E02D303C03632DFF3060
:10037D003D03632EFF303E03632F7F303F03633019
:10038D007FE522622530570EA24AB35009A25CB315
:10039D00925CA25C9284E547B47805E4F547D24FB0
:0D03AD00C2A0C2A1D0D0D082D083D0E03257
:030023000203BA1B
:1003BA00C0E0C0D075D018309922C2ADC253E53E14
:1003CA006016747D2548F8E6F5990548E548B410A5
:1003DA0003E4F548153ED253C299D2AD30981FAF07
:1003EA0099E53CC394105014746D253BF8C6EFC6CA
:1003FA00053BE53BB41003E4F53B053CC298D0D07D
:03040A00D0E0320D
:10040D00E53ED3940E50F9747D253DF8C6EFC60533
:10041D003DE53DB41003E4F53DC2AC053ED2AC2044
:05042D005302D29922E8
:10000300E4FFE53C6017746D2546F8E6FF0546E519
:0E00130046B41003E4F546C2AC153CD2AC2254
:100432007535C8E53CC39F5006E53570F6C322D337
:010442002297
:0B04430012040DE4F546F53BF53C22E9
:020021000022BB
:10044E00D2B600D2B7120021C2B6120021C2B71224
:05045E000021D2B622CE
```

-continued

APPENDIX A

:10046300C2B600D2B7120021D2B6120021C2B7120F
:050473000021D2B622B9
:100478007E01EF54806004D2B68002C2B600D2B7C3
:10048800120021C2B7120021EF25E0FF0EBE09E2DB
:10049800D2B6D2B7120021A2B69251C2B700A25169
:0104A8002231
:1004A9007F01E4FEEE25E0FED2B712002130B6044A
:1004B900CE4401CEC2B71200210FBF09E7D2B7124D
:0B04C9000021C2B7120021CFEECF22AD
:1004D400CCEFCCE4FBD251305111EBC39464500BFC
:1004E40012044E7FA01204780B80EC305102D32208
:1004F400CFECCF120478CFEDCF120478120463A2AC
:02050400512282
:10050600CDEFCDE4FCD251305111ECC39464500BC5
:1005160012044E7FA01204780C80EC3051037F0148
:10052600022CFEDCF120478012044E7FA11204781266
:0905360004A9CCEFCC12046322ED
:10053F008F678B688A6689A69000011214EDFF1228
:10054F0014D4FEC454F04FFDAF671204D4AB68AAA5
:10055F0069A96A9000021214EDFFC454F0FF9000D5
:0E056F00031214ED4FFDE56704FF1204D422C1
:10057D00756A13756B48E4FA901447E493FFEAC368
:10058D009F501D20511ACFEACF856B82856A83E477
:10059D0093FD1204D40A056BE56B7002056A80D8D1
:1005AD00305115E4FF7DFF1204D47552FF7553864B
:1005BD007554AF7555AF80FEE4FF7DC91204D4129A
:0305CD00002622E3
:1005D0008F648B658A6689671205068F68E568C433
:1005E000540FAB65AA66A96712156FE568540FAB87
:1005F00065AA66A967900001121581900001121486
:10060000EDD3940940047F0180027F00AB65AA66A8
:10061000A9671214D4D3940340047E0180027E00A3
:10062000EE4F600312057DE56404FF1205068F6836
:10063000E568C4540FAB65AA66A96790000212155D
:1006400081E568540F9000031215819000031214B5
:10065000EDD3940940047F0180027F00AB65AA6658
:10066000A9679000021214EDD3940540047E018026
:0B067000021E00EE4F600312057F022A9
:10067B001214D4653F70209000011214ED65407088
:10068B0016900021214ED6541700C9000031214C9
:09069B00ED65427002D322C32276
:1006A4007F0C7D021204D47E137F598F828E83E4E3
:1006B400932447F582E43413AF82F5508F517F0DB4
:1006C400120506CBEFCB7F0E120506CAEFCA0BEB61
:1006D400070010A7F0DCDEBCD1204D47F0ECDEACD8F
:1006E4001204D430601EE532AE317805CEC313CE89
:1006F40013D8F9FF7C007D2F1215A37D2D1215B799
:100704008F378005753717D260E4F531F532D24E54
:100714001200B99753903E4F563F549754A01C21E54
:0107240022B2
:100725001200003EF641660030208097F0112043208
:1007350004003020809120003CAEFCAEA24FE604F0B
:1007450004600302080194E4F97F0112043240067FC0
:1007550004120443221200003EF641760067F05129A
:1007650004432278F1612040D7FFF12040DEAFACF15
:10077500EACF1205068F6512040DE565C969C90A38
:10078500BAFFECCFE9CF12040D7F1712040D22E456
:10079500F97F0112043240067F041204432212003D
:1007A5003F864E4FAEAC3956450237F011204328F
:1007B50040077F0412044380151200038F65CFEABA
:1007C500CFAD6512040D4E565C969C90A80D77F0133
:1007D50012043240067F0412044322120003EF691B
:1007E5006006F0312044322120003EF641760067F
:1007F5007F05120443223051067F01120443227FF4
:05080500061204D22A3
:10080A00C2AFE4FF7F04782DE4F608DFFCD2AF2202
:10081A00D252C218D258E4F525D23075270F1208E1
:10082A00A7B007A00793F12002E7533037534E88B
:01083A00229B
:10083B00C252E4F52712080A7F027B007A00793F47
:10084B0012053F7F017D961204D4D24AD218C215ED
:0E085B00C235E4F525FB7A00793F12002E220B
:10086900EF25E0F545EE33F544E539B40309E545EF
:1008790045446003200DF2E53964036006E545450A
:040889004470E622AF
:10085D00CEEFCE12D80AE4F527CFEECF12053F7F4B
:0A089D00017E00120869E4F525222F

-continued

APPENDIX A

:1008A700E054B24FD6019146031240270467F047BF8
:1008B700007A00795612088DC231E4F52580347F1D
:1008C700067B007A00795A12088DE55AD3940240C4
:1008D70002D21AC232E4F52580197F087B007A001C
:1008E700795E12088DE55ED394024002D21BC233B3
:1008F700E04F525C249E4F54BFB7A00793F12002E57
:0109070022CD
:100908007528FC8528A0E4F539C24E120B99D21E31
:0C091800C211C212C213C234E4F5252241
:10092400E536F45521F524E521F45536F5208521E5
:1009340036205D03020B54300008A21CB3921C1233
:100944000B99300426A24CB3924C120B99304C19DB
:10095400C21DE4F525205804D235800F204A04D264
:10096400158008C215C2358002D21D30021B3049E1
:100974001208A712081A020A31305206I2083B5B
:10098400020A3112081A020A31200303020A313022
:1009940052031208B7533037534E8E54B24FE60BB
:1009A4002D146052147003020A2B24046003020AFB
:1009B40031D249C219E4F525D23175270F12080A3C
:1009C4007B007A00795612002E754B02805F7F04FB
:1009D4007B007A00795612088DE4F525C21AC231DB
:1009E40023275270F12080A7B007A00795A120056
:1009F4002E754B0380377F067B007A00795A1208E4
:100A04008DE55AD394024002D21AE4F525C21BC2E2
:100A140032D23375270F12080A7B007A00795E12EE
:100A2400002E754B0480061208A7E4F54B300F0323
:100A3400200E0E054FE54FB4110CD25FE4F54F8044
:100A440005D25FE4F54F200F54305F5130520D7BD7
:100A5400007A00793FC26112011F803F30493CE5B2
:100A640044BB4020B75640075650075665680919E514
:100A74004BB4030B75640075650075665A8009757F
:100A840064007565007566EAB64AA65A966121498
:100A9400D4C394035005C26112011FC25F206E4CDF
:100AA400305F4930520D7B007A00793FC2611201F8
:100AB400097803730493E4BB4020B756400756593
:0D0AC400007566568D19E54BB4030B756490
:100AD100007565007566A80097564007565007555
:100AE100665EAB64AA65A966C261120197C25F2006
:100AF100490330525EE5341534700215314453321
:100B0100700B30520512083B80031208A7300713FF
:100B1100E555648E600D12080AC23AC23B75330373
:100B21007534E830060D12080AC238C2397533032C
:100B31007534E830270D12080AD23AD23B753303D7
:100B41007534E830260D12080AD238D239753303CC
:100B51007534E8200F16200E1320491020520DD5B0
:100B6100430DA25DB3925D120B9930037543323040
:100B71004E23200E2020091D20501CE539B4010907
:100B810012090824812080B9922753902754900756C
:080B91004A01D25022C2502299
:100B9900A25DE433FF25E0FFA24CE4334FFFA24EF0
:100BA900E433FE25E025E04FFFA21CE433FE333396
:100BB9003354F84FFFA248E433FEC454F04FFD7F8D
:050BC9000A1204D42211
:100BCE007528FCC2438528A0C24E120B99D249E467
:100BDE00F525D2185322E05326E0C25BD25A752770
:100BEE00FC25EC257C28412080A7F5A7E001208D4
:100BFE00697528FC8528A07F0A120869C2438528DA
:100C0E00A07F2C0E120869754900754A017528FCE3
:0B0C1E008528A0D21EE4F52580FE22F0
:100C290075A0FCC2AFC2B7D2B675985053877F433F
:100C39008920758DF3D28EE4F5C875CA7875CBEC29
:100C4900D2CAF546F53BF53CF548F53DF53ED2AD42
:100C5900D29CD2ACD2AFFF120506EF64C9603127
:100C6900057F7F027B007A00793F1205D07F047BE6
:100C790007A0079561205D0C2197F067B007A00E6
:100C8900795A1205D0E55AC394035002C21A7F0853
:100C9900784B8E1205D0E55EC394035002A9
:100CA900C21B7F0A12050690132EF4935F24FF925C
:100CB9004CA24CB3921DA3E4935F24FF925DA3E47D
:100CC900935F24FF924EA3E4935F24FF921CA3E455
:100CD900935F24FF9248D235C2847F01120506BF73
:100CE900961275270F0D258C235D2157B007A007951
:100CF9003F12002E304E68C21E7F0C120506FF24EB
:100D0900FEF9E434FFCFE9CFF5508F5145516031F9
:100D190074482551F55174133550F550204817750D
:100D29004C0275390175A0FC754D75754E307549C4
:100D390000754A018029753902754900754AFA809A

APPENDIX A -continued

```
:100D49001E204811753901754D75754E307549006C
:100D5900754A01800A7F057E001208691206A4E51A
:100D69003C600512072580F7D2B3204D030080FAB5
:100D7900C2B3C24D304F52E5427015E5416403607C
:100D890004E541700B7F027B007A00793F12053F31
:100D99007B007A00793FA2527249926112011F5079
:100DA9000F7B007A00793FA2527249926112019732
:100DB9000532E53270020531D394A0E5319405403E
:100DC900067531057532A0C24F120924E539147030
:100DD90003020E7A147003020EAE147003020F633D
:100DE90024036003020D68305D092085062086030F
:100DF90012111930010C305D09300E061206A402D9
:100E0900D68204C03020D68205803020D687B0011
:100E19007A00795612067B5013A252B3500EE54B55
:100E2900640260081206A4D211020D687B007A00E0
:100E3900795A12067B5013A252B3500EE54B640344
:100E490060081206A4D212020D687B007A00795E4E
:100E590012067B4003020D68A252B34003020D68DB
:020E6900E54B57
:100E6B0064047003020D681206A4D213020D68E528
:100E7B004E154E7002154D14454D600620050302AC
:100E8B000D68D248120B99E551455060108528A08A
:100E9B007F017E00120869854C39020D681206A489
:100EAB00020D6830051785394C75390175A0FC7535
:100EBB004D75754E30C248120B99020D68E54A15F7
:100ECB004A70021549144549600030200D68201C1134
:100EDB0020460E20540B75495D754AC0D254020D45
:100EEB0068C2540551E55170020550F58285508357
:100EFB00E493647EF5280551E55170020550F582A7
:100F0B00855083E49375F040A4F54A85F0497F0C36
:100F1B00C3E5519448FDE5509413FC1204D43047BB
:100F2B000E753903E4F563F549754A01020D683016
:100F3B004014E53775F040A4F54A85F049454970F2
:100F4B0005F549754A018528A0E54A454960030224
:100F5B000D68120908020D6830051785394C753973
:100F6B000175A0FC754D75754E30C248120B990278
:100F7B000D68E54A154A70021549144549603028C
:100F8B0010AFE563B40D004003020D68900F9EF89F
:100F9B00282873020FC5020FD3020FF302100502AC
:100FAB00101B02103102104702105D021073021069
:100FBB0087021099020D68020FE7E4F56275630171
:100FCB00F549754A01020D687528FCC2458528A0B4
:100FDB00754900754A2875630C020D6875490D75C6
:100FEB004AAC75630A020D687528FC8528A0754903
:100FFB0000754A32756303020D687528FCC243C243
:10100B00448528A0754902754A04020D6884
:0C101B007528FCC245C2448528A0754918
:1010270001754AF4756305020D687528FCC243C251
:10103700448528A0754902754AEE756306020D6856
:101047007528FCC245C2448528A0754901754AF434
:10105700756307020D687528FCC243C2448528A042
:10106700754902754AEE756308020D687528FCC25A
:10107700438528A0754911754A94756309020D685F
:101087007528FC8528A0754904754A3275630102E9
:101097000D687552FF7553567554AF90133FE493EF
:1010A700F555120BCE020D68E563640A6003020D65
:1010B70068208603020D687528FC8528A0C3E54AC9
:1010C70094BEE549940A500575390280210562E509
:1010D70062D3940340157552FF7553867554AF90CC
:1010E7001340E493F555120BCE80037563027549DF
:0810F70000754A01020D682298
:1010FF00E4FFFE000FBF00010EBEFDF7BFE9F422B3
:0A110F003085FD2085FD1210FF223F
:10111900090133FE493F5557554BF7553877552FF86
:10112900C284C257C24BC25E12080A7523FFE4F596
:1011390026F522F527F525D25BD248D25D7F01FE3F
:10114900120869C2428528A012110FC2438528A03E
:1011590012110FC2448528A012110FC2458528A07B
:1011690012110FC2468528A012110F7528FC852877
:10117900A07F017E00120869A3E493F5553085FD2F
:101118900012FFC21D200C07D23530850A80FB30B2
:1011990085032009CFAD21D3085FD1210FFC24820AC
:1011A9000D0530850C80FBD256308503200DFAD20F
:1011B900483085FD1210FFC25B200907D25A3085DD
:1011C9000A80FB3085032009FAD25B3085FD1210B5
:1011D900FFC21E3085032009FAD21E3085FD121088
:1011E900FFC25D3085032009FAD25D3085FD1210FA
:1011F900FFC218200A07D23030850A80FB308503E8
:10120900200AFAD2183085FD1210FFC219200B07E7
:10121900D23130850A80FB308503200BFAD2193090
:1012290085FD1210FFC21A308503200BFAD21A303D
:1012390085FD1210FFC21B308503200BFAD21B302B
:1012490085FD1210FFC21C200807D23430850A80A0
:10125900FD3085032008FAD21C3085FD1210FFE40B
:10126900FD7D04785274C9F608DDFC7D04D25E2048
:101279000E0875270F30850880FB308503200EFA8C
:101289003085FD1210FFE4FD7D04785274B6F6082E
:10129900DDFC7D04D284D24B200F0875270F3085E1
:0D12A9000B80FB308503200FFA12057D221B
:0400260002000022B2
:030000000214489F
:0C144800787FE4F6D8FD75818C02148FCB
:1014D400BB010689828A83E0225002E722BBFE0216
:0914E400E32289828A83E4932249
:1014ED00BB010CE58229F582E5833AF583E02250B4
:1014FD0006E92582F8E622BBFE06E92582F8E222FE
:0D150D00E58229F582E5833AF583E4932217
:10151A00BB010989828A83F8E028F022500327F761
:10152A0022BBFE05F8E328F3228A838982F8E49332
:02153A00282265
:10153C00BB010FF8E58229F582E5833AF583E028B3
:10154C00F0225009C58229F8E58226F622BBFE0955
:10155C00C58229F8E22582F222F8EA2583F583E98F
:03156C009328229F
:10156F00BB010689828A83F0225002F722BBFE015B
:02157F00F32255
:10158100F8BB010DE58229F582E5833AF583E8F0A0
:10159100022500 6E92582C8F622BBFE05E92582C84C
:0215A100F22234
:1015A300EFF88DF0A4FFEDC5F0CEA42EFEEC88F08D
:0415B300A42EFE2242
:1015B700BC000BBE0029EF5DF084FFADF022E4CC18
:1015C700F875F008EF2FFFEE33FEEC33FCEE9DECE1
:1015D700984005FCEE9DFE0FD5F0E9E4CEFD22ED27
:1015E700F8F5F0EE8420D21CFEADF075F008EF2F71
:1015F700FFED33FD4007985006D5F0F222C398FD62
:051607000FD5F0EA22FE
:10145400020C29E493A3F8E493A34003F68001F279
:1014640000DFF48029E493A3F85407240CC8C33399
:10147400C4540F4420C8834004F456800146F6DF68
:10148400E4800B010204081020408090120E47E30
:10149400019360BCA3FF543F30E509541FFEE4935D
:1014A400A360010ECF54C025E060A840B8E493A324
:1014B400FAE493A3F8E493A3C8C582C8CAC583CA4F
:1014C400F0A3C8C582C8CAC583CADFE9DEE780BE07
:01132D0000BF
:00000001FF
```

What is claimed is:

1. A method of manufacture of non-crushable, re-usable cat litter granules, the method comprising:

mixing a plastic material and clay;

extruding the mixture of plastic material and clay into a filament;

solidifying the filament; and separating the filament into non-crushable, re-usable cat litter granules.

2. A method according to claim 1 and wherein the mixing step also includes adding a deodorizing material.

3. Non-crushable, re-usable cat litter granules comprising: granules each containing a mixture of at least a plastic material and clay.

4. Non-crushable, re-usable cat litter granules according to claim 3 and wherein said mixture comprises a plastic material, an elastomer and clay.

5. Non-crushable, re-usable cat litter granules according to claim 4 and wherein said mixture also comprises a deodorizing material.

* * * * *